United States Patent
Noblecourt et al.

(10) Patent No.: US 7,340,528 B2
(45) Date of Patent: Mar. 4, 2008

(54) DATA REFERENCING SYSTEM

(75) Inventors: Christophe Colas Noblecourt, Paris (FR); Setra Rakotomavo, Paris (FR)

(73) Assignee: Thomson Licensing S.A., Boulogne-Billancourt (FR)

( * ) Notice: Subject to any disclaimer, the term of this patent is extended or adjusted under 35 U.S.C. 154(b) by 567 days.

(21) Appl. No.: 10/472,398

(22) PCT Filed: Mar. 21, 2002

(86) PCT No.: PCT/IB02/02141

§ 371 (c)(1), (2), (4) Date: Aug. 12, 2004

(87) PCT Pub. No.: WO02/076102

PCT Pub. Date: Sep. 26, 2002

(65) Prior Publication Data

US 2005/0015797 A1    Jan. 20, 2005

(30) Foreign Application Priority Data

Mar. 21, 2001  (EP) ................... 01400737

(51) Int. Cl.
*G06F 15/16*    (2006.01)
(52) U.S. Cl. ...................... 709/231; 715/747
(58) Field of Classification Search ............... 709/217, 709/231; 715/747; 725/47
See application file for complete search history.

(56) References Cited

U.S. PATENT DOCUMENTS

| | | | |
|---|---|---|---|
| 5,929,849 A | 7/1999 | Kikinis | |
| 6,094,661 A * | 7/2000 | Salomaki | 707/104.1 |
| 6,230,172 B1 * | 5/2001 | Purnaveja et al. | 715/512 |
| 6,904,453 B2 * | 6/2005 | Shuster | 709/203 |
| 2001/0037359 A1 * | 11/2001 | Mockett et al. | 709/203 |
| 2004/0015842 A1 * | 1/2004 | Nanivadekar et al. | 717/109 |
| 2004/0250277 A1 * | 12/2004 | Freimann et al. | 725/39 |

FOREIGN PATENT DOCUMENTS

| | | |
|---|---|---|
| EP | 0 810 790 A2 | 12/1997 |
| EP | 0 810 790 A3 | 12/1997 |
| GB | 2 327 837 A | 2/1999 |
| WO | WO 00/24195 | 4/2000 |

OTHER PUBLICATIONS

International Search Report for Appln. No. PCT/IB02/02141, mailed Oct. 31, 2002, 7 pages.

* cited by examiner

*Primary Examiner*—Salad Abdullahi
(74) *Attorney, Agent, or Firm*—Osha Liang LLP

(57) ABSTRACT

This application describes a method of referencing content in an application. The method comprises, for a content element, creating a reference to the content element and associating that reference with the content element. This enables the content (for example, text or images) to be dissociated from other features related to content; for example, its presentation on the screen. In this way, control over presentation may be achieved separately from control of the content itself. In an example, a Content Provider 402 provides referenced content to an Operator 404. A Programme Provider 400 sends referenced scenarios to the Operator 404. The Operator 404 resolves the reference and sends data for broadcast by the Broadcaster 406.

20 Claims, 20 Drawing Sheets

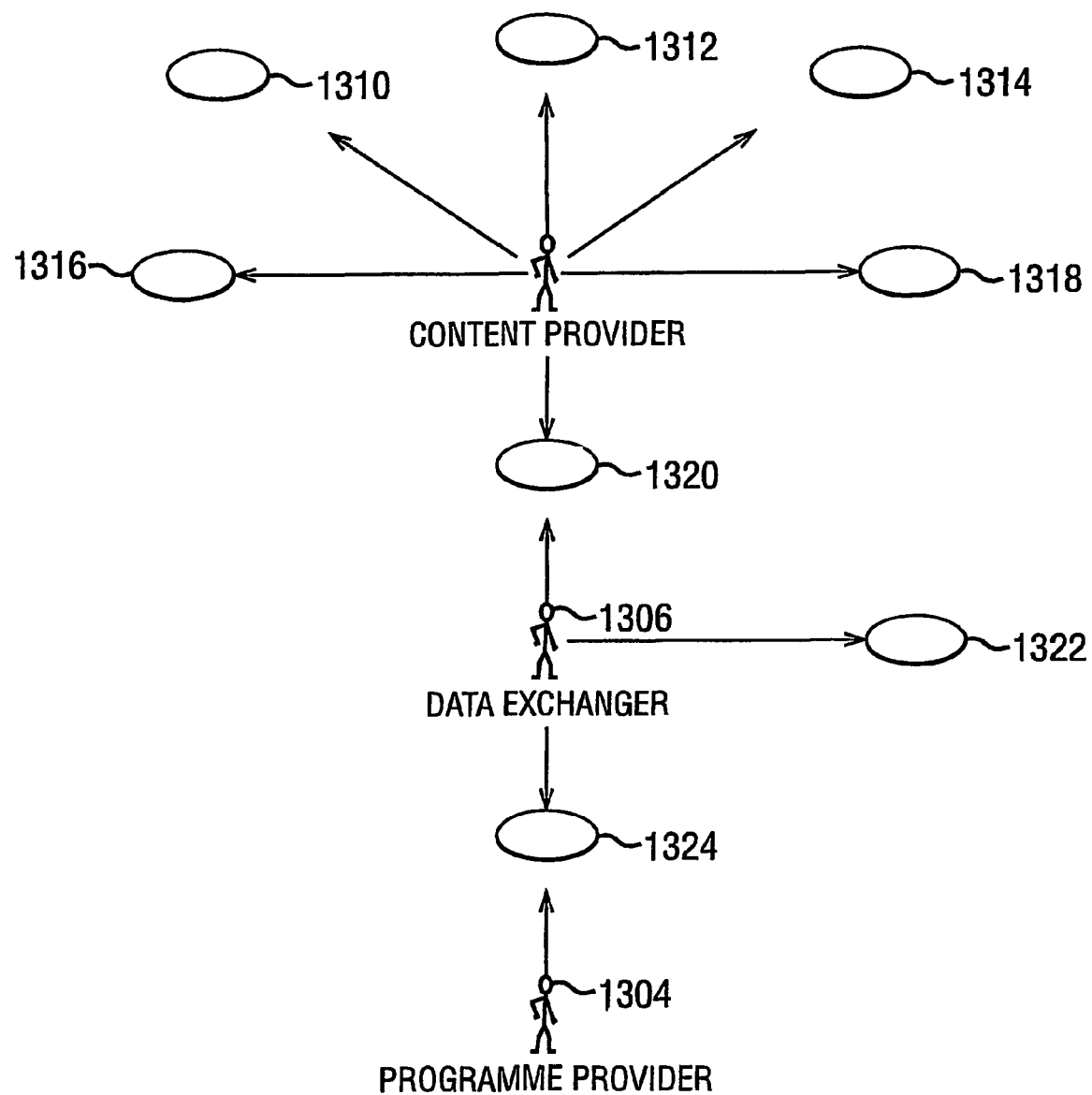

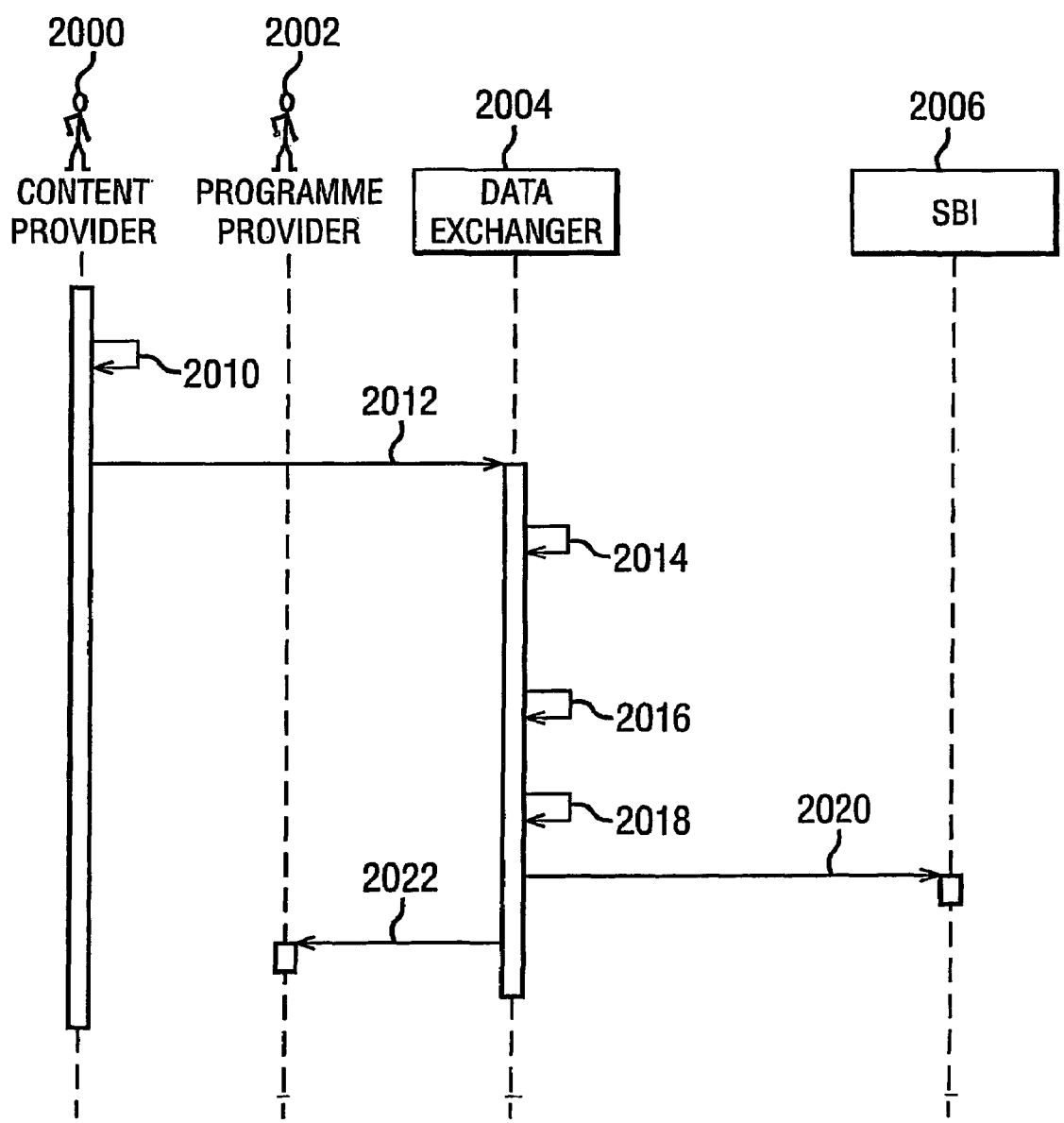

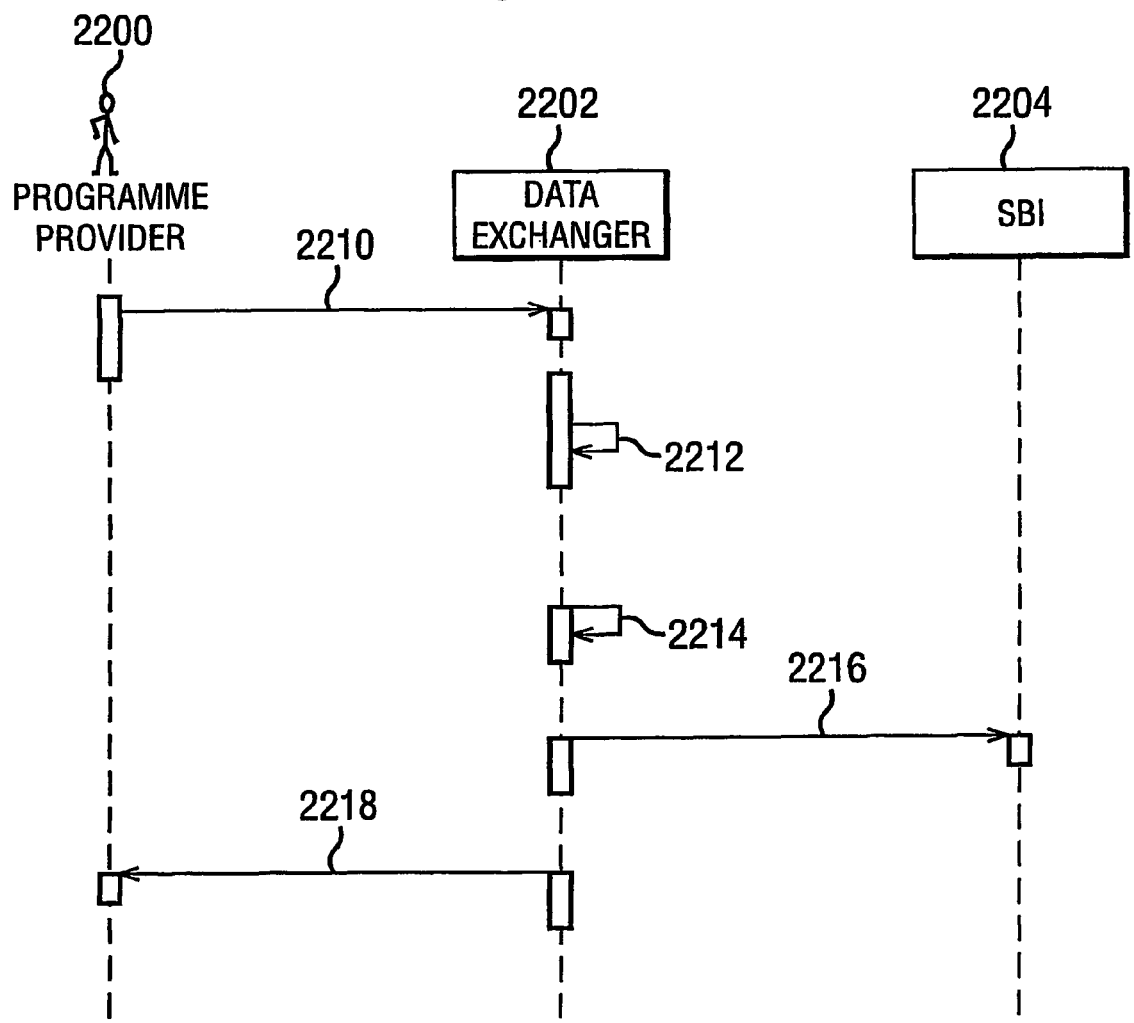

DATA REFERENCING SYSTEM

This invention relates to a data referencing system. The invention finds particular, but not exclusive, application in a digital transmission system and preferred examples of the invention described below relate to a data referencing system and method in particular to apparatus and method for referencing data to be downloaded to a receiver/decoder, and to a method and apparatus for resolving the referenced data, and to a method and apparatus for preparing data for broadcast.

The term "receiver/decoder" used herein may connote a receiver for receiving either encoded or non-encoded signals, for example, television and/or radio signals, which may be broadcast or transmitted by some other means. The term may also connote a decoder for decoding received signals. Embodiments for such receiver/decoders may include a decoder integral with the receiver for decoding the received signals, for example, in a "set-top box", such a decoder functioning in combination with a physically separate receiver, or such a decoder including additional functions, such as a web browser, a video recorder, or a television.

The advent of digital transmission systems intended primarily for broadcasting television signals, in particular but not exclusively satellite television systems, has opened up the possibility of using such systems for other purposes. One of these is to provide interactivity with the end user. As used herein, the term "digital transmission system" includes any transmission system for transmitting or broadcasting for example primarily audiovisual or multimedia digital data. Whilst the present invention is particularly applicable to a broadcast digital television system, the invention may also be applicable to a fixed telecommunications network for multimedia internet applications, to a closed circuit television, and so on.

One way of interacting with the user is to run an application on the receiver/decoder through which the television signal is received. The code for the application could be permanently stored in the receiver/decoder. However, this would be rather limiting. Preferably, the receiver/decoder should be able to download the code for a required application. In this way, more variety may be provided, and applications can be updated as required without any action on the part of the user.

In an MPEG system, application code may be downloaded in MPEG tables transmitted in an MPEG bitstream. The term MPEG refers to the data transmission standards developed by the International Standards Organisation working group "Motion Pictures Expert Group" and in particular but not exclusively the MPEG-2 standard developed for digital television applications and set out in the documents ISO 13818-1, ISO 13818-2, ISO 13818-3 and ISO 13818-4. In the context of the present patent application, the term includes all variants, modifications or developments of MPEG formats applicable to the field of digital data transmission.

Software for downloading the MPEG tables are stored permanently in the receiver/decoder. In order to download data such as application code or an updated version of a run time engine, complex software is required, this software typically taking up a large amount of memory.

Examples of the invention relate to the creation and application of a data referencing system which allows the exchange and manipulation of data coming from heterogeneous systems and going to interactive services such as interactive television systems.

More and more information services are being provided to end users. For an Operator providing the information to the end user, the information is often provided by a large number of information providers, referred to herein as Content Providers. For example, financial information may be provided by one or more different specialist financial Content Providers, and sport information may be provided by one or more specialist sport Content Providers. The number and type of different Content Providers is constantly growing and changing.

Each Content Provider may produce in-house the information in a different format. Transmission of the different formats of information to the user is often impractical, and indeed the Operator wir often wish to have a uniform presentation of information to the user.

The Content Provider now has to provide the information content to the Operator in the Operator's required format. If the information content has already been created by the Content Provider for a different purpose, for example for a different Operator either for the same or a different medium (for example the Internet), the format may not be compatible with that required by the new Operator, and often the information has to be recreated in the desired format. This can include the requirement for retyping sections of text of the information content. Clearly this is disadvantageous in that it is very time consuming and can inhibit dissemination of information to a wide audience.

Also, even once the information content has been provided to the Operator, it may be updated. Updates may occur frequently, for example every few minutes. If the format of the original information content has been fixed by the Operator, it is very time consuming to ensure that the update information will be compatible with the original format. If not, then an incorrect display of the updated information may occur, for example if the updated text of the information is longer than the original text, the end of the updated text may be omitted on transmission.

In a broadcast system, the Operator may wish to send information to the end user via an MPEG stream system. Frequent information updates could result in a large amount of processing of the information for display to the user at the user end, for example the receiver/decoder. With the limited processing capacity available in the receiver/decoder, this would be disadvantageous. Also, the receiver/decoder might not be able to cope with error situations relating to the information, without even more of the limited memory and processing available at the receiver/decoder being used.

A first aspect of the invention provides a method of referencing content in an application comprising, for a content element; creating a reference relating to the content element; and associating the reference with the content element.

The method of the first aspect of the invention enables the content (for example text and/or images) to be dissociated from other features relating to the content, for example its presentation on a screen.

Preferably, the reference comprises an element relating to the presentation of the content.

In this way, control over presentation may be achieved separately from control of the content itself. Content and its presentation can be treated separately; in examples of the invention, the presentation and content are kept separate until just before broadcast. This also has benefits when updating the content using the same presentation, as is discussed in more detail below.

The content may be of any kind. For example, in a broadcast system, the content may comprise text, one or more images and/or a graphical object. In examples described below, the content comprises editorial data, for example newspaper articles, which may, for example, be updated every day. The content element may be associated with the reference, for example by including a reference element in a content module including the content element indicating the reference to be associated with that element of the content.

The reference may include information, for example defining the size of the content to be displayed.

Thus, in examples of the invention, there are two types of data: data relating to presentation of content, and the content itself. In previous methods, it has not been possible to make any separation between the two types of data and it was necessary to use an editing tool to control both types of data simultaneously, and manually. Using methods according to the invention, it is possible to control each type of data independently.

Preferably, the reference comprises a plurality of reference elements. Thus various features relating to the data can be defined. The reference elements may be stored together as described in more detail below, but may alternatively be stored in different places.

Preferably the reference includes a reference element relating to the source of the data and/or a reference element relating to the location of the data.

Using that reference information assists with the presentation of the data.

Preferably the reference comprises a logical reference element.

By including such an element, editing of the references and of templates relating to the presentation is facilitated.

The logical reference may function as a type of "address" for the data. Each element of data may have its own unique identifier. Examples of this identifier are referred to herein as a URI (Uniform Resource Identifier). The URI may include information relating to the nature of the data, its source, its location and concerning image size.

By using a logical reference element rather than a physical reference element, for example the value of an element of data provided by the Content Provider, more information is available to the system relating to the presentation of the content. It also gives much more flexibility for altering the presentation.

In examples of the invention, the Programme Provider creates a logical reference relating to the Content Provider's physical reference for a content element.

Typically, when it is desired to post a piece of text on a screen, this piece of text belongs to a major graphical object such as the Menu or Display Zone. This object therefore contains the description of the group of each line, and in the case of a Display Zone, the detail of the regrouping by page of different lines. With the updating of a text block (separated into lines and pages) having a large impact on the format of the object it displays, it is often necessary to enter the text into an editing tool manually.

The definition of a logical referencing system described in examples herein is based on the association of data useable by an interactive service with a unique identifier called a URI (Uniform Resource Identifier). The use of these URIs by different participants of the service definition systempermits the physical and functional dissociationbetween the objects loaded onto the screen (Menu and Display Zone) and external editing contents (Text and Images). Content and screen objects can be treated separately and put together automatically at effectively the last minute, due to forward plannming and an editing tool in the Programme Provider.

The participant responsible for the graphical definition of the screens can effectively declare the use of a URI inside these objects.

By using a URI, each element or piece of data within an application system may be uniquely referenced. This reference can be associated with an object or file relating to the presentation of the content.

Preferably the reference further includes a reference element for a default value for the data.

By providing a default value, if there is any problem in associating the correct data to its presentation (which is preferably defined by the reference), or if there is no data, the default value can be shown.

Also, an initial broadcast of the presentation of the data, for example a screen, can be made even before any content for the screen is available. For example, an object can be created to show theresults offootballmatches. Before thematcheshavebegun, therewilbeno data relating to the results, but the object for the results may still be broadcast, showing the default value (for example a message or picture) until the results begin to arrive.

Preferably the reference elements for a content element are stored together, preferably in a single file. In preferred embodiments of the invention, all of the references relating to a source reference element are all stored together.

Preferably the method further includes using the reference to broadcast a display scenario.

Preferably the method further includes the steps of: analysing the reference; and creating a container for the content element having this reference.

Preferably the default data is initially entered into this container. The method may further include sending the container for broadcast.

The presentation of the content may comprise a layout including several different screens having various objects, for example text boxes and images. A "scenario" referred to herein comprises a set of screens which contain different objects. The scenario may be created by an Programme Provider, completely independently of the actual content which will be included in the screens, although of course in collaboration with the Content Provider and the Operator and/or Broadcaster with regard to the requirements for content. An aspect of the present invention provides an editing tool for creating a screen including objects (for example text boxes), the editing tool being adapted for creating a reference for the object. Between the Content Provider and the Programme Provider it can be decided which references the Programme Provider may use.

Using the editing tool, the Programme Provider uses the references to build up scenarios. He can store them on his local hard disk until he is ready to send them, for example to the Operator, for broadcast. The Programme Provider can preview the scenarios, for example using the default values, and checks can be carried out at this stage, for example to make sure that the Programme Provider has used authorised references (an error message is preferably returned, if not).

The Content Provider provides the referenced editorial data for inclusion into the Programme Provider's screens. This editorial data is preferably sent directly to the Operator and not to the Programme Provider or Programme Provider. The Programme Provider determines how the screens are to look knowing the reference which he may use. The Content Provider sends referenced content to the Operator for broadcast; this content is merged with the screens provided by the Programme Provider for broadcast.

In preferred embodiments, the Programme Provider has already provided the scenarios and their references before any data is received from the Content Provider. Preferably, the Operator performs the following steps on receiving the scenario: read the elements of the data sent, analyse the reference of an object and assign broadcast parameters. Preferably, the method includes analysing the reference and creating a container for the data This is preferably stored at the Operator. Preferably the method further includes inserting a default value for the data into the container. Preferably the default value is always stored, so that it is available for use if, for example, there is a fault. Preferably, the method further includes broadcasting the container; preferably after conversion to MPEG.

Preferably the method further comprises resolving the reference for a content element including the steps of: receiving a content element; identifying a reference relating to the presentation of the content element; and using the content element and the reference to create the data for displaying the content.

As the content is obtained from the Content Provider, it needs to be merged with the reference to create an object for broadcast including the content. The Operator knows already, for example from the Programme Provider, which references it is awaiting content from the Content Provider and/or which need to be updated. The Operator preferably has a list of all of the references and each time it receives content from the Content Provider, it checks that the reference sent by the Content Provider correlates with a known reference.

A further aspect of the invention provides a method of resolving a reference for a content module comprising: receiving a content element; identifying a reference relating to the presentation of the content element; and using the content element and the reference to create the data for display.

Preferably the method includes the steps of: receiving a file containing content data; identifying a reference element and obtaining a container relating to the reference element; reading a logical reference element of the container; recovering the item of content data corresponding to the logical reference element; and inserting the content data item into the container.

Preferably the method further includes: identifying a presentation criterion; analysing the content element with respect to the presentation criterion; and determining the presentation of the content.

The presentation criterion may include, for example, the size of an object into which the content data is to be fitted in a display. In this way, consideration may be made as to, for example, the amount of text to be fitted into a text box, as well as the number of screens or pages required to display the content. Preferably, this is carried out substantially automatically.

This feature is of particular importance and is provided independently.

A further aspect of the invention provides a method of determining the presentation of content, the method comprising: receiving the content to be presented; identifying a presentation criterion; analysing the content with respect to the presentation criterion; and determning the presentation of the content.

By providing a method to determine the presentation of content, it is possible to achieve correct presentation of varying content within fixed presentation objects, for example text boxes. The determination of the presentation of the content may comprise resizing the content to fit into a predetermined object on the screen, for example a text box or picture frame, and/or resizing the object so that the content fits the object. In preferred examples of the invention, the method includes analysing the size of the content and determining the size of the object for displaying the content. For example, where the content comprises text to fit into a text box, preferably the method includes analysing the text, preferably character by character, for a given width of the text box. Once a word would pass across the right-hand edge of the box, that word is placed onto the next line of the box, and so on until all the text has been placed into the box, or the end of the defined box is reached. Preferably, if the end of the box is reached, the next line is put into a new box, which may be a continuation of the present box, for example on a separate screen of the display.

The content element and/or the reference may include a reference element which indicates attributes of the content, for example character pitch. This information can be used to assist in the determination of the size of the displayed text. Preferably, the analysis comprises receiving content information. The content information may comprise, for example information regarding the size of the content, for the example of text, its length, character pitch and number of characters, for a picture, the width and height.

Preferably the analysis comprises determining if the content is larger than the first page of the relevant display zone object, and, if so, adding a new page.

Each screen may include a display zone, which may, for example include a title, main text and picture. One or more of those objects may be resizable.

Some of the objects are preferably of a fixed size and the content is of fixed format. For such objects, no resizing is allowed. This may be effected, for example, for a title which must have a fixed character pitch and size, and must not be allowed to be partly on one page, and partly on a continuation page. The same may apply for pictures. If the text or picture is longer than the object, the extra matter is cut.

Preferably the method comprises determining that an exceptional condition has occurred and using a default value for the content. Thus, for example if an error occurs in trying to present the new content, or the content is such that a reasonable presentation cannot be achieved, a default screen is shown, rather than risk an unsatisfactory display of the content being shown to the user. Preferably the default value is stored upstream of the broadcast centre.

Preferably the method further comprises: receiving updated content; analysing the content; and determring a presentation of the updated content.

Preferably the method further comprises analysing whether the new content is valid. If not, the content may revert to the default value or the content is not updated.

Preferably the method is substantially automated.

The automation of, for example, data formatting allows the need for manual re-entry of data to be avoided. The re-entry has previously been necessary, for example when reformatting a web page from the internet for TV broadcast. In the case where the text is dynamic, (the content varies with a certain frequency), it would be necessary to re-enter, within the editing tool, the information so that it can fit in the page and it may also be necessary to store the information in an associated database. This can be avoided by allowing the automatic dynamic updating of the text. A request to broadcast of the module containing the object will allow the subsequent replacement of the object in the broadcast stream.

Effecting the unique identification of the external data (for example, from the Content Provider) allows their control from the head end, and because of this, it allows their attachment to loaded graphical objects that are to be displayed. A method of cutting out and reforming text blocks according to their sizes which are fixed by the display area allows their transformation and insertion into the description of the container object, according to the strict rules of the format of the description of the data at the receiver/decoder level.

An advantage of this is that text and images from other formats such as web sites, databases, xml files or other storage sources can be reformatted automatically to supply the interactive TV services.

Preferably the merged scenario and data is sent to a receiver/decoder to be viewed by the user. In preferred embodiments, the merged pages of the display are not actually stored, but are cyclically broadcast, for example every second or so. In some cases the broadcaster will be able to store data. For example, particularly important data could be stored. In many cases, however, the only content data to be stored will be the default values of the objects.

Preferably the merged data is converted to MPEG format for broadcast. The MPEG sections are given an ID in the broadcast server. Preferably these IDs are unique, and the tables of IDs are replaced as the data is updated. It is to be noted that the update of the tables will, in the examples described, occur when the Content Provider provides more data, and not when the Operator requests new information; the system can be thought of as a "push" system. See below regarding PIDS and TIDS Preferably the resolution of the data occurs before broadcast to the receiver/decoder.

Thus, preferably, the methods described above further include sending the data for broadcast.

The receiver/decoder has relatively little processing power and memory, and thus resolution, formatting and other processing at the receiver/decoder would be very slow.

This feature is of particular importance and is provided independently.

A further aspect of the invention provides a method of preparing content for broadcast comprising: receiving a content element; identify a reference relating to the content; preparing data for use in displaying the content; and sending the prepared data for broadcast.

Preferably, the reference relates to the presentation of the content, the method preferably further including configuring the content for display using the reference.

Preferably, the method further includes the step of using the content element and the reference to prepare data of or displaying the content.

Head end capacity is greater than set-top box capacity for resolution, since the capacity in the set top box is very restricted; particularly taking into account the extent and frequency of the information being sent to the set top box for dynamic screen updating. The memory management and performance of the receiver/decoders is limited and it is not possible to effect, within the services, a resolution of the logical addresses (herein specifically the data references). Effecting the resolution at the head end puts in place a method of circumventing the receiver/decoder capacity restrictions.

An advantageous feature of aspects of the present invention is to be able to effect the resolution of the logical referencing of the data at the head end.

The referencing of the external data could allow (in theory) the separate broadcasting of the data in the satellite stream. The separate data being the graphical objects on one hand and the content data to be displayed on the other hand. Therefore, the analysis and retrieval of the URIs at the interactive service level requires a lot of machine time, which is incompatible with the already briming receiver/decoder capacity. The effecting of these operations on a server, upstreamform the finalbroadcasting (the 'pure' broadcasting), provides the benefit of an important and evolvable operating power (scalability and Load-Balancing).

An advantage of this feature is that wastage of software running time at the end-user end can be avoided. This saves valuable software rnning time in the receiver/decoder.

It is envisaged, however, that some processing of the data could take place at the receiver/decoder. For example, beforebroadcast, the text of a text box could be analysed and cut in the relevant places so as to fit into the text box. This information would then be sent to the receiver/decoder which would, knowing the box size, find the relevant box and merge it with the pre-formatted content.

Preferably the method further includes converting the data to MPEG format.

A further aspect of the invention provides an apparatus for referencing content in an application comprising: means (preferably an editing tool) for creating a reference relating to the content element and means (preferably the editing tool) for associating the reference with the content element.

Preferably the reference comprises a reference element relating to the source of the content and a reference element relating to the location of the content element.

A further aspect of the invention provides a logical reference element for referencing data.

Preferably the apparatus comprises a first data store for storing the reference; and a second data store for storing a container relating to the reference, the container being adapted to hold content data associated with the reference.

A further aspect of the invention provides apparatus for resolving a reference for a content module, including: means (preferably a processor) for receiving a content element; means (preferably a processor) for identifying a reference relating to the content element; and means (preferably a processor) for merging the content element and the reference to create the data for displaying the content.

A further aspect of the invention provides an apparatus for determining the presentation of content, the apparatus comprising: means (preferably a processor) for receiving the content to be presented; means (preferably a processor) for identifying a presentation criterion; means (preferably a processor) for analysing the content with respect to the presentation criterion; and means (preferably a processor) for determining the presentation of the content.

A further aspect of the invention provides an apparatus for creating a template for the presentation of content on a screen, the apparatus including: means (preferably a processor) for creating an object for displaying a content element; means (preferably a processor) for allocating a reference to the object for associating the object with the content element.

A further aspect of the invention provides an apparatus for preparing content for broadcast, comprising: means (preferably a processor) for using the reference for the content to prepare data for displaying the content; and means (preferably a processor) for sending the data for broadcast.

The invention further provides a method of broadcasting data, including receiving data produced according to any method described herein, and broadcasting the data.

The invention also provides a computer program and a computer program product for carrying out any of the methods described herein and/or for embodying any of the apparatus features described herein, and a computer readable medium having stored thereon a program for carrying out any of the methods described herein and/or for embodying any of the apparatus features described herein.

The invention also provides a signal embodying a computer program for carrying out any of the methods described herein and/or for embodying any of the apparatus features described herein, a method of transmitting such a signal, and a computer product having an operating system which supports a computer program for carrying out any of the methods described herein and/or for embodying any of the apparatus features described herein.

The invention also provides a method substantially as described herein with reference to the accompanying drawings, and apparatus substantially as described herein with reference to and as illustrated in the accompanying drawings.

A further aspect of the invention provides a method of preparing a received content element for presentation, comprising: receiving data including a content element; reviewing the received data to identify a reference associated with the content element; and using the reference to determine the presentation configuration for the content element. The method preferably comprises using the reference to determine the location of the content element in the received data.

The method preferably further comprises using the reference to determine a default value for presentation.

The method preferably includes the step of using the reference to identify a container for the content element. Preferably, the container contains the presentation configuration criteria for the content element. The method preferably further includes the step of determining the number of containers required for presenting the content element and the step of associating the content element with a container. The method preferably further comprises the steps of: reading a logical reference element of the container; recovering the content element in the received data corresponding to the logical reference element; and linking the content element with the container.

The method preferably comprises converting the content element in the container into a broadcastable form, for example, MPEG.

Preferably, the received data is reviewed to identify the size of the content element and the content element size is compared with the predetermined maximum size for presentation of the content element. Preferably, the method comprises the steps of: identifying that the size of the content element is larger than the predetermined maximum size for presentation of the content element; identifying an excess portion of the content element being in excess of the predetermined maximum size of presentation; and preparing the excess portion for presentation.

The method preferably further comprises preparing the excess portion for presentation, including iing the excess portion with a further container.

A further aspect of the invention provides apparatus for preparing a received content element for presentation, comprising: means (preferably a receiver) for receiving data including a content element; means (preferably a processor and associated memory) for reviewing the received data to identify a reference associated with the content element; and means (preferably a processor and associated memory) for using the reference to determine the presentation configuration for the content element.

The apparatus preferably comprises means (preferably a processor and associated memory) for using the reference to determine the location of the content element in the received data.

The apparatus preferably comprises a default value for presentation. This default value is preferably held in a data store; in preferred examples in a database, the default value being associated with the reference in the database.

The apparatus preferably further includes a container for the content element, the container being associated with the reference for the content element. Preferably, the container contains the presentation configuration criteria for the content element.

Preferably, the apparatus further comprises means (preferably a processor and associated memory) for determining the number of containers required for presenting the content element. There is also preferably provided means (preferably a processor and associated memory) for associating the content element with a container. This apparatus preferably further comprises: means (preferably a processor and associated memory) for reading a logical reference element of the container; means (preferably a processor and associated memory) for recovering the content element in the received data corresponding to the logical reference element; and means (preferably a processor and associated memory) for linking the content element with the container.

The apparatus preferably comprises means (preferably a processor and associated memory) for converting the content element liked with the container into a broadcastable form.

The apparatus preferably comprises means (preferably a processor and associated memory) for reviewing the received data to identify the size of the content element and means (preferably a processor and associated memory) for preparing the content element size with a predetermined maximum size for presentation of the content element. The apparatus preferably comprises: means (preferably a processor and associated memory) for identifying that the size of the content element is larger than the predetermined maximum size for presentation of the content element; means (preferably a processor and associated memory) for identifying an excess portion of the content element being in excess of the predetermined maximum size for presentation; and means (preferably a processor and associated memory) for preparing the excess portion for presentation, which preferably includes means (preferably a processor and associated memory) for linking the excess portion with a further container.

The apparatus preferably includes a receiver/decoder.

According to a further aspect of the invention, there is provided a computer program product comprising code for preparing a received content element for presentation, the preparation comprising the steps of: receiving data including a content element; reviewing the received data to identify a reference associated with the content element; and using the reference to determine the presentation configuration for the content element.

The computer program product preferably further comprises code for using the reference to determine the location of the content element in the received data and preferably comprises code for using the reference to determine a default value for presentation.

The computer program product preferably further comprises code for using the reference to identify a container for the content element. The container preferably contains the presentation configuration criteria for the content element.

The computer program product preferably further comprises code for determining the number of containers required for presenting the content element.

The computer program product preferably comprises code for associating the content element with a container.

The computer program product preferably further comprises code for: reading a logical reference element of the container; recovering the content element in the received data corresponding to the logical reference element; and linking the content element with the container.

The computer program product preferably comprises code for converting the content element in the container into a broadcastable form.

The computer program product preferably comprises code for reviewing the received data to identify the size of the content element and comparing the content element size with the predetermined maximum size for presentation of the content element. The computer program product preferably further comprises code for: identifying that the size of the content element is larger than the predetermined maximum size for presentation of the content element; identifying an excess portion of the content element being in excess of the predetermined maximum size of presentation; and preparing the excess portion for presentation. Preferably, preparing the excess portion for presentation includes linking the excess portion with a further container.

A further aspect of the invention provides a computer program product comprising code for, for a content element; creating a reference relating to the content element; and associating the reference with the content element. The reference preferably comprises an element relating to the presentation of the content. The reference preferably further includes a reference element relating to the source of the data and/or a reference element relating to the location of the data. The reference preferably comprises a logical reference element. The reference preferably further includes a reference element for a default value for the data.

The computer program product preferably comprises code for: analysing the reference; and creating a container for the content element having this reference.

The computer program product preferably further comprises code for resolving the reference for a content element including the steps of: receiving a content element; identifying a reference relating to the presentation of the content element; and using the content element and the reference to create the data for displaying the content.

The computer program product preferably further comprises code for: receiving a content element; identifying a reference relating to the presentation of the content element; and using the content element and the reference to create the data for display. The computer program preferably further comprises code for: receiving a file containing content data; identifying a reference element and obtaining a container relating to the reference element; reading a logical reference element of the container; recovering the item of content data corresponding to the logical reference element; and inserting the content data item into the container.

The computer program product preferably further comprises code for: identifying a presentation criterion; analysing the content element with respect to the presentation criterion; and determining the presentation of the content.

The computer program product preferably further comprises code for: receiving the content to be presented; identifying a presentation criterion; analysing the content with respect to the presentation criterion; and determining the presentation of the content. The computer program product preferably further comprises code for: receiving updated content; analysing the content; and determining a presentation of the updated content. The method is preferably substantially automated.

The computer program product preferably further comprises code for sending the data for broadcast.

According to a further aspect of the invention, there is provided a computer program product, comprising code for: receiving a content element; identifying a reference relating to the content; preparing data for use in displaying the content; and sending the data for broadcast. The reference preferably relates to the presentation of the content, the method further including configuring the content for display using the reference. The computer program product preferably further comprises code for using the content element and the reference to create data for displaying the content.

The computer program product preferably further comprises code for converting the data to MBEG format.

An aspect of the invention provides a method of broadcasting data, including receiving data according to a method described herein and broadcasting the data.

A further aspect provides a broadcast system, including a broadcast centre and apparatus as described herein.

Any feature in one aspect of the invention may be applied to other aspects of the invention, in any appropriate combination.

Preferred features of the present invention will now be described, purely by way of example, with reference to the accompanying drawings, in which:

FIG. 12 is a general diagram illustrating the creation of a reference to a datum;

FIG. 19 is a sequence diagram also illustrating the stopping of the broadcast of an external data reference;

FIG. 21 is a sequence diagram also illustrating ceasing the broadcast of a scenario;

SYSTEM OVERVIEW

Figure 1:
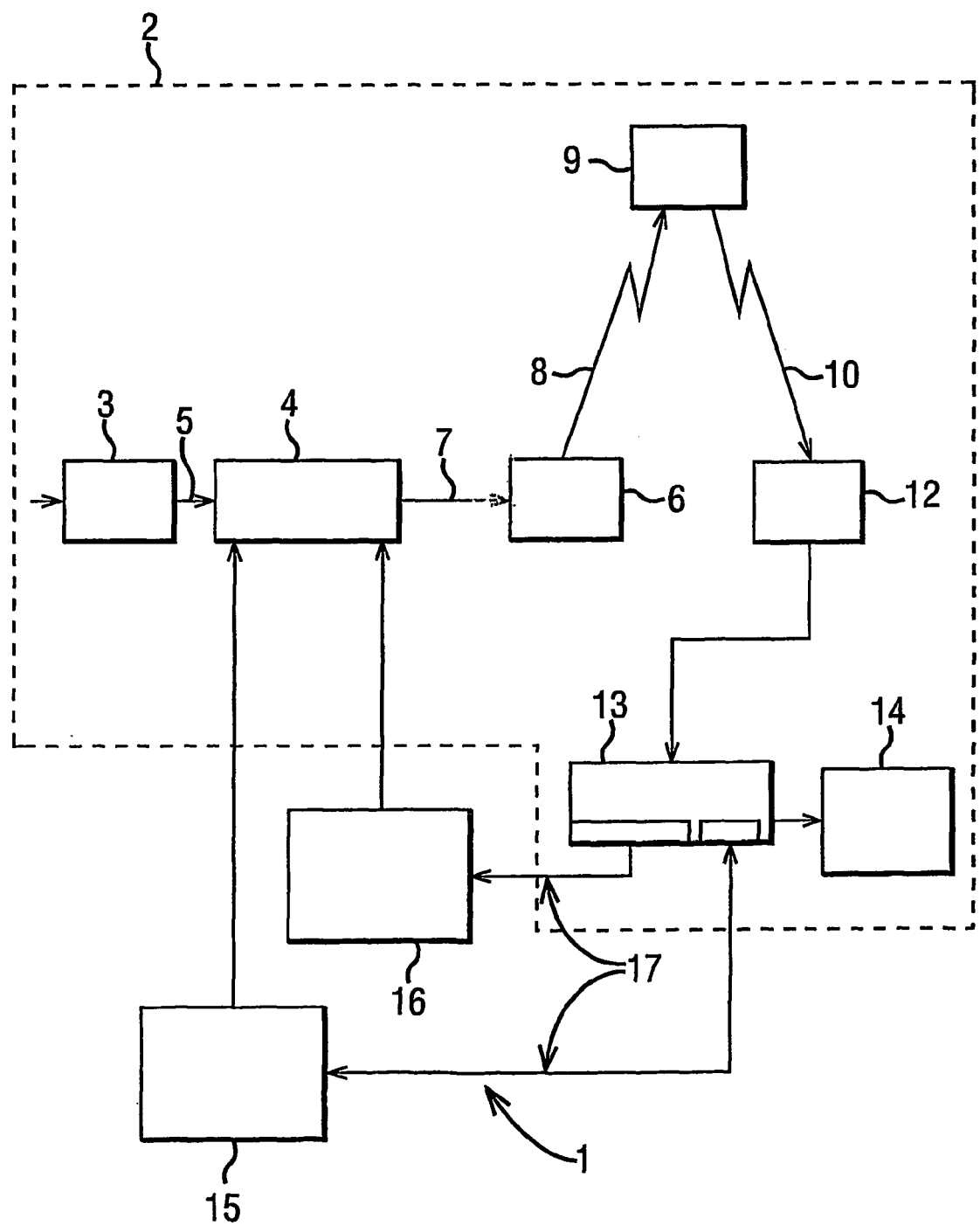
FIG. 1 shows an overview of a typical digital television system.

An overview of a digital television system 1 is shown in FIG. 1. The invention includes a mostly conventional digital television system 2 that uses the known MPEG-2 compression system to transmit compressed digital signals. In more detail, MPEG-2 compressor 3 in a broadcast centre receives a digital signal stream (typically a stream of video signals). The compressor 3 is connected to a multiplexer and scrambler 4 by linkage 5.

The multiplexer 4 receives a plurality of further input signals, assembles the transport stream and transmits compressed digital signals to a transmitter 6 of the broadcast centre via linkage 7, which can of course take a wide variety of forms including telecommunications links. The transmitter 6 transmits electromagnetic signals via uplink 8 towards a satellite transponder 9, where they are electronically processed and broadcast via notional downlink 10 to earth receiver 12, conventionally in the form of a dish owned or rented by the end user. Other transport channels for transmission of the data are of course possible, such as terrestrial broadcast, cable transmission, combined satellite/cable links, telephone networks etc.

The signals received by receiver 12 are transmitted to an integrated receiver/decoder 13 owned or rented by the end user and connected to the end user's television set 14. The receiver/decoder 13 decodes the compressed MPEG-2 signal into a television signal for the television set 14. Although a separate receiver/decoder is shown in FIG. 1, the receiver/decoder may also be part of an integrated digital television. As used herein, the term "receiver/decoder" includes a separate receiver/decoder, such as a set-top box, and a television having a receiver/decoder integrated therewith.

In a multichannel system, the multiplexer 4 handles audio and video information received from a number of parallel sources and interacts with the transmitter 6 to broadcast the information along a corresponding nuniber of channels. In addition to audiovisual information, messages or applications or any other sort of digital data may be introduced in some or all of these channels interlaced with the transmitted digital audio and video information.

A conditional access system 15 is connected to the multiplexer 4 and the receiver/decoder 13, and is located partly in the broadcast centre and partly in the receiver/decoder. It enables the end user to access digital television broadcasts from one or more broadcast suppliers. A smartcard, capable of deciphering messages relating to commercial offers (that is, one or several television programmes sold by the broadcast supplier), can be inserted into the receivet/decoder 13. Using the receiver/decoder 13 and smartcard, the end user may purchase commercial offers in either a subscription mode or a pay-per-view mode.

As mentioned above, programmes transmitted by the system are scrambled at the multiplexer 4, the conditions and encryption keys applied to a given transmission being determined by the access control system 15. Transmission of scrambled data in this way is well known in the field of pay TV systems. Typically, scrambled data is transmitted together with a control word for descrambling of the data, the control word itself being encrypted by a so-called exploitation key and transmitted in encrypted form.

The scrambled data and encrypted control word are then received by the receiver/decoder 13 having access to an equivalent to the exploitation key stored on a smartcard inserted in the receiver/decoder to decrypt the encrypted control word and thereafter descramble the transmitted data. A paid-up subscriber will receive, for example, in a broadcast monthly EMM (Entitlement Management Message), the exploitation key necessary to decrypt the encrypted control word so as to permit viewing of the transmission.

An interactive system 16, also connected to the multiplexer 4 and the receiver/decoder 13 and again located partly in the broadcast centre and partly in the receiver/decoder, enables the end user to interact with various applications via a back channel 17. The back channel may be, for example, a Public Switched Telephone Network (PSTN) channel (for example, a modemmed back channel) or an Out of Band (OOB) channel. The back channel may also be used for communications used in the conditional access system 15.

Receiver/decoder

Figure 2:
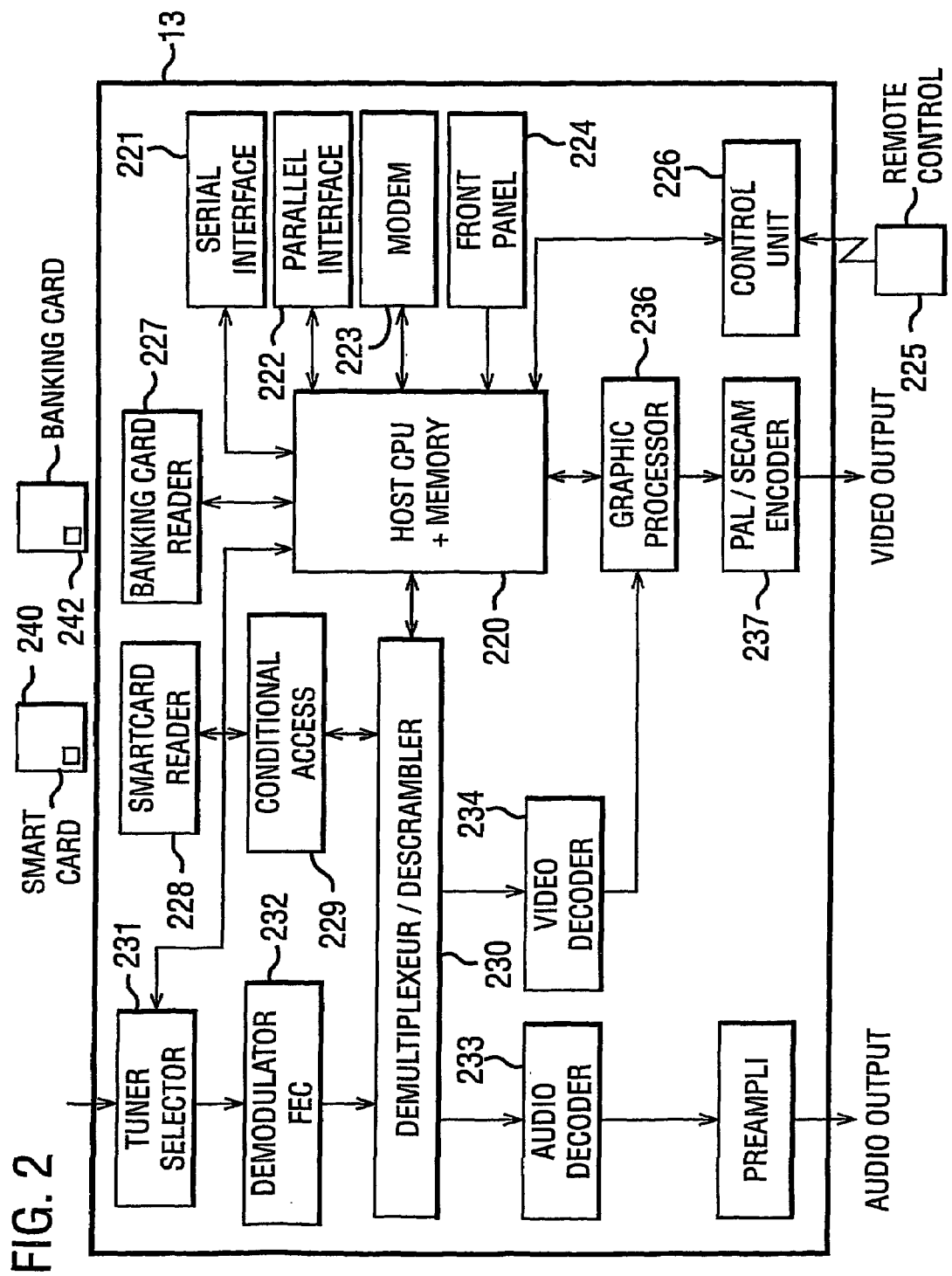
FIG. 2 is a block diagram of a receiver/decoder.

Referring to FIG. 2, the various elements of receiver/decoder 13 will now be described in terms of functional blocks.

The receiver/decoder 13, which may be, for example, a digital set-top box (DSTB), comprises a central processor 220 including associated memory elements and adapted to receive input data from a serial interface 221, a parallel interface 222, a modem 223 (connected to the modem back channel 17 of FIG. 1), and switch contacts 224 on the front panel of the decoder.

The receiver/decoder is additionally adapted to receive inputs from an infra-red remote control 225 via a control unit 226 and also possesses two smartcard readers 227, 228 adapted to read bank and subscription smartcards 242, 240 respectively. The subscription smartcard reader 228 engages with an inserted subscription card 240 and with a conditional access unit 229 to supply the necessary control word to a demultiplexer/descrambler 230 to enable the encrypted broadcast signal to be descrambled. The decoder also includes a conventional tuner 231 and demodulator 232 to receive and demodulate the satellite transmission before being filtered and demultiplexed by the unit 230.

As used in this description, an application is preferably a piece of computer code for controlling high level functions of preferably the receiver/decoder 13. For example, when the end user positions the focus of remote control 225 on a button object seen on the screen of the television set 14 and presses a validation key, the instruction sequence associated with the button is run.

An interactive application proposes menus and executes commands at the request of the end user and provides data related to the purpose of the application. Applications may be either resident applications, that is, stored in the ROM (or FLASH or other non-volatile memory) of the receiver/decoder 13, or broadcast and downloaded into the RAM or FLASH memory of the receiver/decoder 13.

Applications are stored in memory locations in the receiver/decoder 13 and represented as resource files. The resource files comprise graphic object description unit files, variables block unit files, instruction sequence files, application files and data files, as described in more detail in the above-mentioned patent specifications.

The receiver/decoder contains memory divided into a RAM volume, a FLASH volume and a ROM volume, but this physical organization is distinct from the logical organization. The memory may further be divided into memory volumes associated with the various interfaces. From one point of view, the memory can be regarded as part of the hardware; from another point of view, the memory can be regarded as supporting or containing the whole of the system shown apart from the hardware.

Architecture of Receiver/decoder

Figure 3:
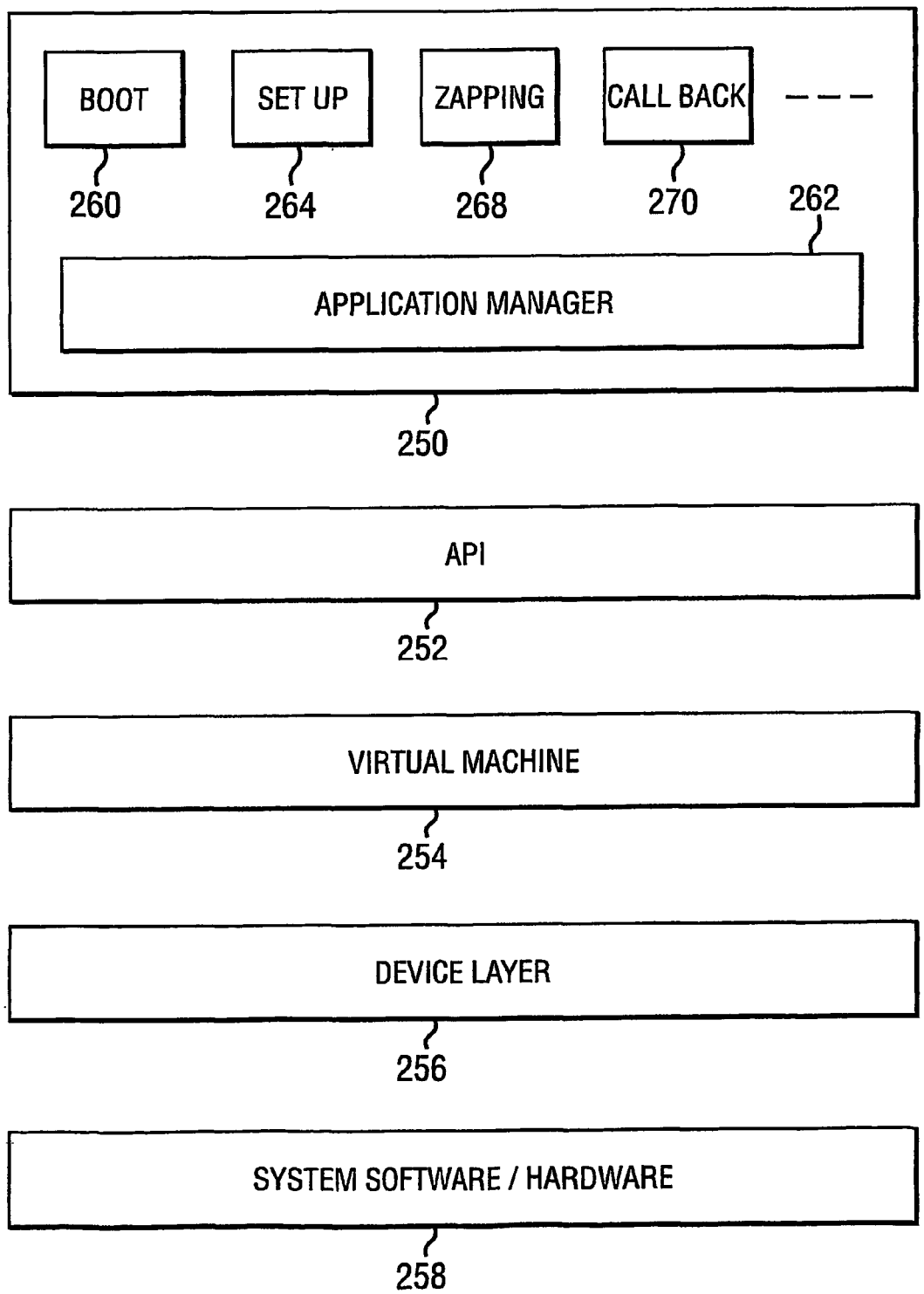
FIG. 3 shows the architecture of a receiver/decoder.

The receiver/decoder contains five software layers, organized so that the software can be implemented in any receiver/decoder and with any operating system. Referring to FIG. 3, the various software layers are Application Layer 250, Application Programing Interface (API) layer 252, Virtual Machine Layer 254, Device Layer 256 and System Software/Hardware Layer 258.

The Application Layer 250 encompasses applications that are either resident in or downloaded to the receiver/decoder. They may be interactive applications used by customers, written in, for example, Java, HTML, MHEG-5 or other languages, or they may be applications used by the receiver/decoder to run such applications. This layer is based on a set of open Application Programming Interfaces (APIs) provided by the Virtual Machine layer. This system allows applications to be downloaded to flash or RAM memory in the receiver/decoder on-the-fly or on demand. The application code can be transmitted in compressed or uncompressed format using protocols such as Data Storage Media Command and Control (DSMCC), Network File Server (NFS) or other protocols.

Interactive applications are applications that the user interacts with, for example, to obtain products and services, such as electronic program guides, telebanking applications and games. The following resident applications are used to manage interactive applications:

Boot. The Boot application 260 is the first application launched when the receiver/decoder is powered on. TheBoot application starts the different "Managers" in the Virtual Machine, the first being the Application Manager 262.

Application Manager. The Application Manager 262 manages the interactive applications that are run in the receiver/decoder, that is, it starts, stops, suspends, resumes, handles events and deals with communication between applications. It allows multiple applications to run at once, and thus is involved in the allocation of resources among them. This application is completely transparent to the user.

SetUp. The purpose of the SetUp application 264 is to configure the receiver/decoder, primarily the first time it is used. It performs actions such as scanning for TV channels, setting the date and time, establishing user preferences, and so on. However, the SetUp application can be used at any time by the user to change the receiver/decoder configuration.

Zapping. The Zapping application 268 is used to change channels using the Program-up, Program-down and numeric keys. When another form of zapping is used, for example, through a banner (pilot) application, the Zapping application is stopped.

Callback. The Callback application is used to extract the values of various parameters stored in the receiver/decoder memory and return these values to the commercial operator via modemmed back channel 17, or by other means.

The API layer 252 provides high-level utilities for interactive application development. It includes several packages that make up this high-level API. The packages provide all the functionality necessary to run interactive applications. The packages are accessible by the applications.

In a preferred embodiment the API is adapted to run applications written in the Java programming language.

Furthermore, it can interpret HTML and other formats, such as MHEG-5. Besides these interpreters, it also includes other packages and service modules that are detachable and extensible as requirements dictate.

The Virtual Machine layer 254 is composed of language interpreters and various modules and systems. It consists of everything necessary to receive and execute interactive applications in the receiver/decoder.

The Device Interface layer 256 includes a Device Manager and devices. Devices are software modules which consist of the logical resources necessary for management of external events and physical interfaces. The Device Layer manages communication channels between drivers and applications and provides enhanced error exception checking. Some examples of managed devices are: card readers, modems, network, PCMCIA (Personal Computer Memory Card International Association), LED display and so on. Programmers do not have to deal with this layer directly, since the API layer controls the devices from above.

The System Software/Hardware layer 258 is provided by the manufacturer of the receiver/decoder. Because of the modularity of the system and because services supplied by the OS (such as event scheduling and memory management) are part of the Virtual Machine, the higher layers are not tied to a particular real-time operating system (RTOS) or to a particular processor.

In the context of a receiver/decoder, a specific class of object called a module will now be described.

Figure 4:
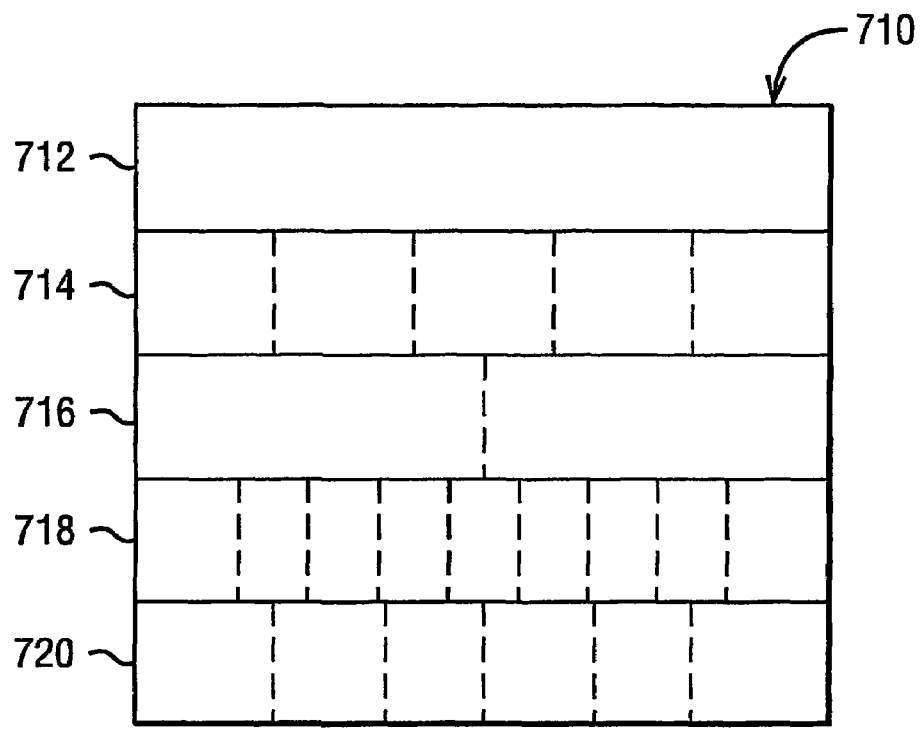
FIG. 4 shows the arrangement of files within a module downloaded into the memory of an interactive receiver/decoder.

With reference to FIG. 4, a module 710, such as a tele-shopping module, is a set of resource files and data comprising the following:

a single application file 712;
an undetermined number of graphic object description unit files 714;
an undetermined number of variables block unit files 716;
an undetermined number of instruction sequence files 718; and
where appropriate, data files 720 such as icon library files, image files, character font files, colour table files and ASCII text files.

The concept of modules 710 together with the concept of downloading small pieces of code allows the easy evolution of applications. They can be downloaded into permanent FLASH memory of the receiver/decoder 13 (not shown) as resident software or broadcast in order to be downloaded into the RAM of the receiver/decoder 13 only when needed by the end user.

In the case of MPEG flow, one module 710 is transported in one single MPEG table. In the case of modules transmitted to the MPEG tuner (not shown), the long MPEG-2 format is used, with a long header and a CRC code. This is also the case with the five other interfaces of the receiver/decoder (serial interface, parallel interface, modem and two card readers—not shown), except that the "short" MPEG-2 format with a shorter header and no CRC is used.

Figure 5:
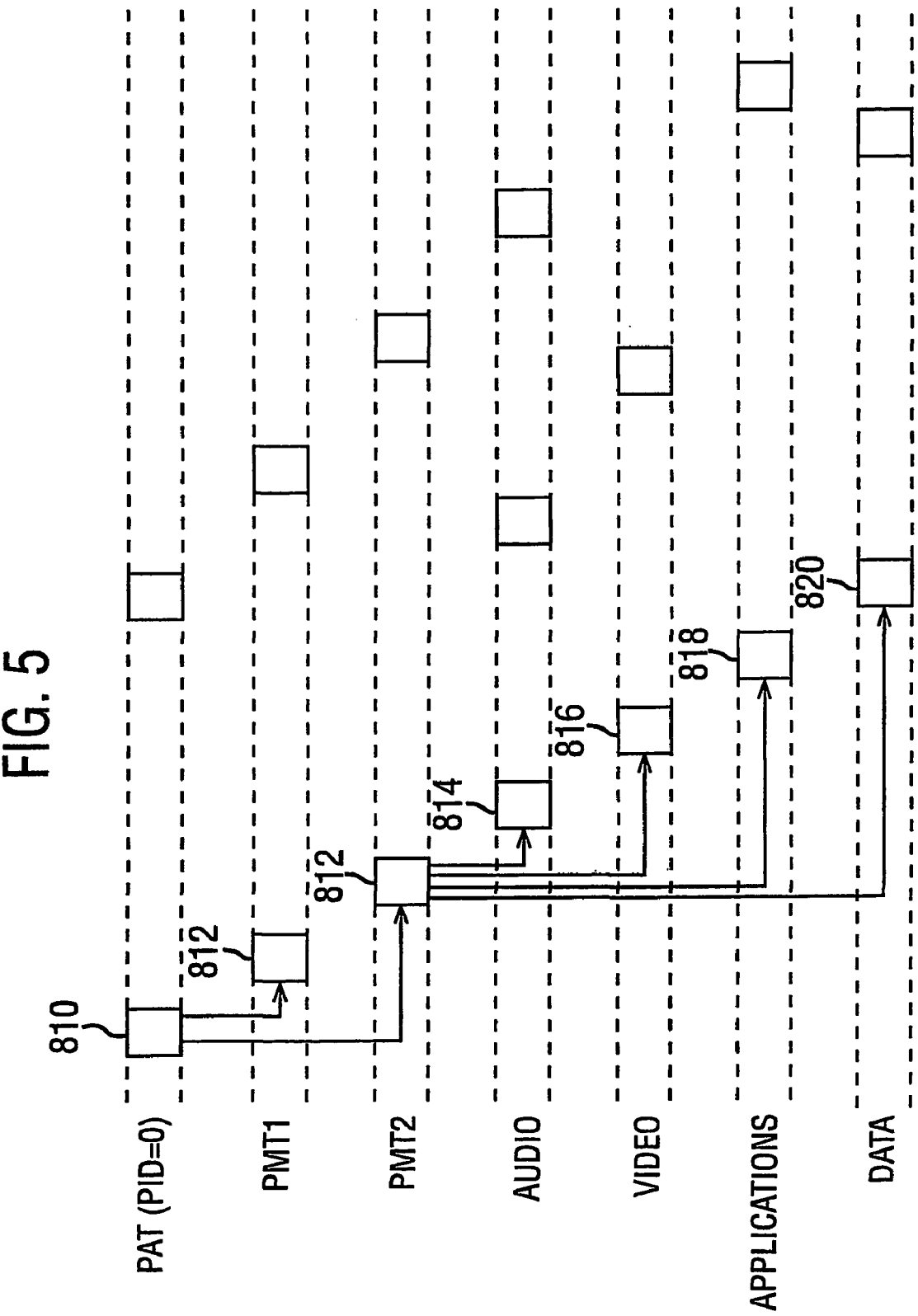
FIG. 5 illustrates an interrelationship between a number of components of an MPEG stream.

Referring in particular to FIG. 5, as is known, the MPEG-2 bitstream includes a programme access table ("PAT") 810 having a packet identification ("PID") of 0. The PAT contains references to the PIDs of the programme map tables ("PMTs") 812 of a number of programmes. Each PMT contains a reference to the PIDs of the streams of the audio MPEG tables 814 and video MPEG tables 816 for that programme. A packet having a PID of zero, that is the programme access table 810, provides the entry point for all MPEG access.

In order to download applications and data for them, two relevant stream types are defined, and the relevant PMT also contains references to the PIDs of the streams of application MPEG tables 818 (or sections of them) and data MPEG tables 820 (or sections of them).

Figure 6:
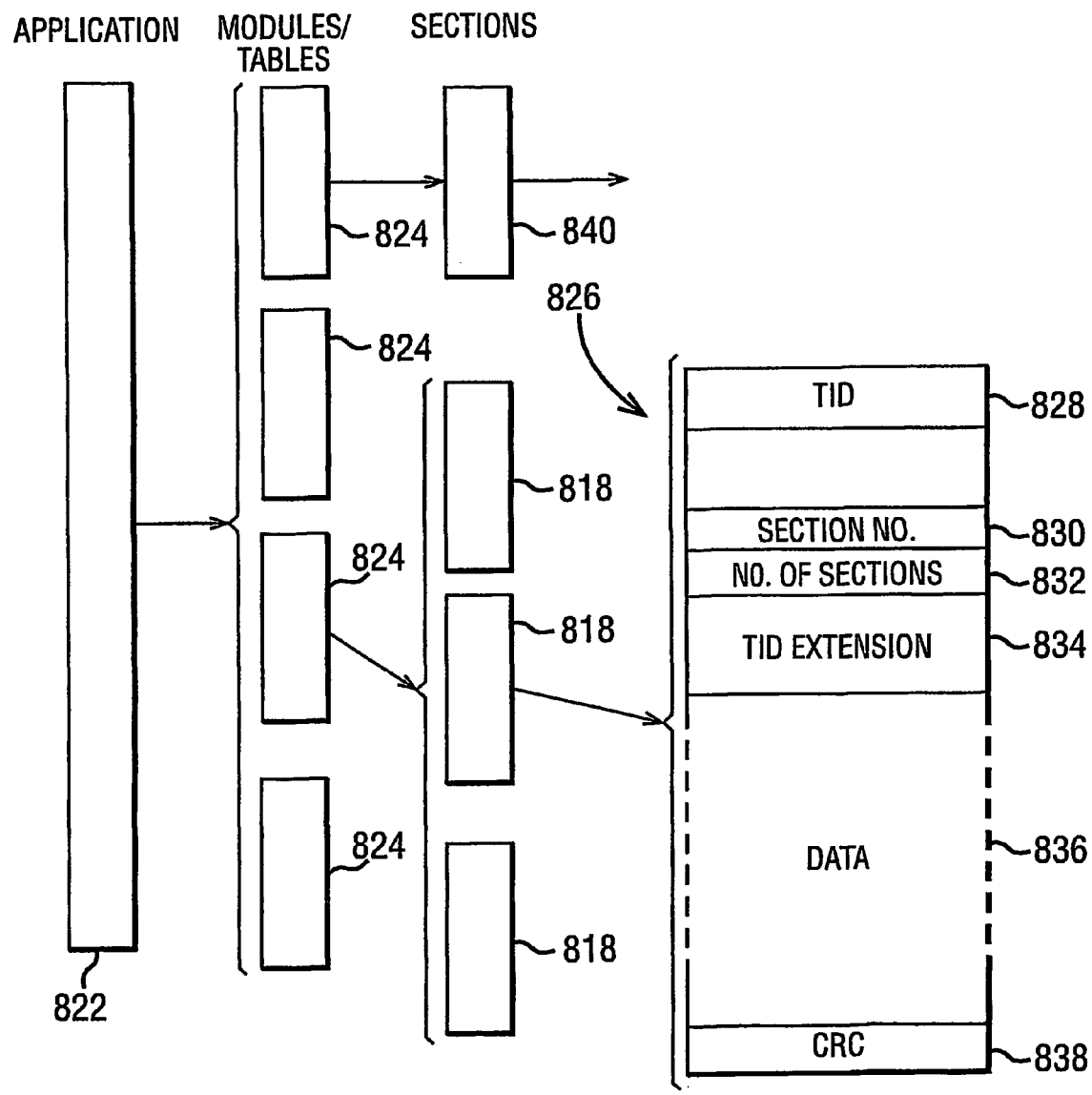
FIG. 6 illustrates how an application may be made up of modules/tables, which in turn may be made up of sections.

Referring to FIG. 6, in order to download an application 822, the application is divided into modules 824 each formed by an MPEG table, some of which are made up by a single section 818, and others of which may be made up by a plurality of sections 818. A typical section 818 has a header 826, which includes a one-byte table identification ("TID") 828, the section number 830 of that section in the table, the total number 832 of sections in that table and a two-byte TID extension 834. Each section also includes a data part 836 and a CRC 838. For a particular module/table 824, all of the sections 818 making up that table 824 have the same TID 828 and the same TID extension 834. For a particular application 822, all of the tables 824 making up that application 822 have the same TID 828, but different respective TID extensions.

The above-mentioned system for transferring data to a receiver/decoder in a digital broadcast system is versatile enough to allow, for example, web pages to be broadcast in relation to particular programmes or channels, which can then be viewed in tandem with the programmes or channels in question.

Figure 7:
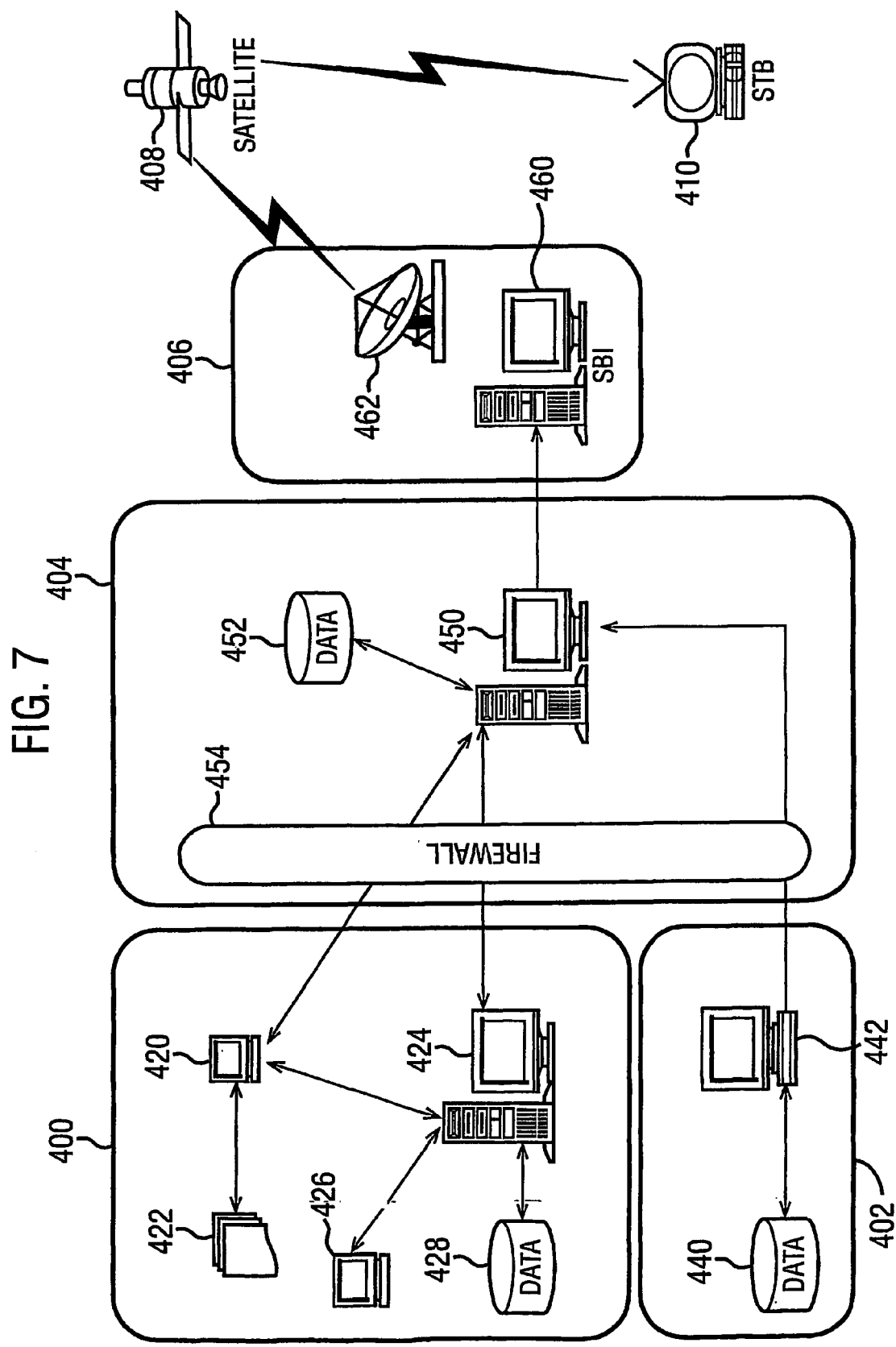
FIG. 7 is a simplified overview.

FIG. 7 is a simplified overview. An Programme Provider 400, a Content Provider 402, an Operator 404, a Broadcast Centre 406, a satellite 408, and a set top box (STB) 410 are shown.

The Programme Provider 400 comprises an off-line editor 420, a storage device 422 containing XTVML files, an application server 424, an on-line editor 426 and a data storage device 428.

The Content Provider 402 comprises a data storage device 440 and a broadcast console 442.

The Operator 404 comprises a Web server 450, a data storage device 452 and a firewall 454.

The Broadcast Centre comprises a Section Broadcast Injector (SBI) 460 and a satellite transmitter 462.

Connections between the Programme Provider 400, the Content Provider 402, the Operator 404 and the Broadcast Centre 406, and between their various components are represented by arrows in the diagram.

The section that follows presents the functional and technical specifications related to the use of data references.

The notion of a universal reference (Uniform Resource Identifier) allows each element or piece of data within an application system to be uniquely referenced. In addition, it allows each of these elements to be defined by a logical descriptor, and no longer defined directly by a system resource. Every physical modification of data does not lead to a modification at the level of the applications which describe the usage format. This offers the advantage, for an application, of decorrelating the part describing the presentation of data (the 'container'), and the part concerned with the data itself (the 'content').

The Programme Provider is responsible for creating the screens which constitute a scenario. These screens are made up of elementary objects allowing the data to be displayed and exploited. In the case of data from a related external source, the referencing principle is used to design it.

The Content Provider is responsible for sending to the operator a collection of referenced data. This data is sent according to variable frequencies which depend on their editorial or advertising interests.

The Operator is responsible for the broadcast of the data. The data is split into two categories: in one part the description of the screens and the XTVML objects of the application which come from the Programme Provider, and in the other part the external data originating from the Content Provider.

One recalls that the URI structure which is used is normalised in accordance with the following structure:
<Scheme>:<StreamLocator>:<DataLocator>

The <Scheme> field represents the type of system resource (service, application or data), <StreamLocator> represents the data stream, and <DataLocator> represents the packet of data.

For example, to look up the value of the CAC40 (French stockmarket indicator), one can utilise the following URI notation:

<dtv-d>:<Bourse_de_Paris>:<CAC40>

It is noted that here the StreamLocator represents the data stream issued by the Content Provider, and not the transport flux of the data at the broadcast level. This detail is important at the level of the assembly of the data, which will be described below.

The logical descriptor is the concise and explicit definition of the data To return to the example of the CAC40, the logical descriptor can, as for itself, be represented by: 'Value of the CAC40'.

For greater flexibility in use, this is the descriptor which can be used at the level of an editing tool by a user wishing to find a piece of data without knowing its URI.

The container is in fact the XTVML filename representing the description of an elementary XTVML object, whose content is referenced by a URI. This XTVML file is converted into the form of an MPEG table identified by a PID, TID and TIDExt.

The referenceable external data can be of simple editorial type, that is to say text or images. It is sent by the Content Provider to the operator at a predetermined, but variable frequency.

It is possible to distinguish between two types of external data, principally linked to their refreshing frequency:

The first type is streamed: the data is modified and sent by the Content Provider with a high frequency, and must be automatically refreshed at the level of the decoder.

The second type is normal: the data is modified little over the course of time, and does not require automatic refreshing.

As one can see, it is important here to specify the external data type because for streamed data, it is necessary to indicate to the receiver/decoder whether or not it should put into place a system for scanning the version of tables transporting the data. The type of data is thus sent, either at the level of the XTVML objects which contain the data (for example by the Programme Provider), or at the same level as the data (for example by the Content Provider).

The reference resolution, that is the mechanism consisting in associating a physical piece of data with a logical reference, takes place upstream of the broadcasting processes.

This stage cannot normally take place at the receiver/decoder because of lack of processing capacity at the receiver/decoder.

With regard to the broadcast of an application, the resolution consists of replacing the logical reference with a physical reference. If this physical reference does not exist, it will be generated.

With regard to the broadcast of external content, the resolution consists of replacing the reference present within a container with the same value as the data (lines of text, image, and so on).

With the aim of avoiding all problems of broken links when a reference is used on a receiver/decoder, it is advantageous to introduce the notion of a default reference value. This consists of defining, for the reference to an item of data originating from an external Provider, the value which must be displayed by the decoder in the case where a problem in transferring the real data takes place within the assembly chain. These default values, typically a piece of text or an image, are defined either globally with respect to an application, or at the same level as the data. These values are furthermore transferred no further down the line than at the operator level, that is, before the broadcast of the application format, so that the default values can be inserted in the event of a problem inside the containers which use their corresponding reference.

The data used by the system can be sensitive or subjected to rights; therefore two levels of security can be defined, the first concerning access rights to references, and the second, the exploitation rights of the data.

Each editing tool only has the right to exclusively use certain referenced elements placed at its disposal. Furthermore, these rights allow the responsibilities relative to the broadcasting or cessation of broadcasting of data to be managed. To allow this to be done, it is relevant to define the collection of users before access is permitted to a given item of data, or category of data. These rights are defined by the operator according to the properties of the eventual users.

It is also possible to specify for an item of data, the time period within which it is broadcast. One imagines this typically begins for the broadcast of an advertisement linked to a particular programme. At the end of the broadcast, the broadcast will automatically be halted.

The data originating from a Content Provider can be subjected to exploitation rights, for example, pictures can be made the object of utilisation and broadcast rights.

In light of the different points set out above, the following XML structure is proposed for the data files:

```
<content_provider type = 'data' stream_locator='Bourse_de_Paris' date='01/09/2000'>
    <licenses>
<content_provider type='data'stream_locator= 'Bourse_de_Paris'date= '01/09/2000'>
    <licenses>
        <license appli_prov= 'CSAT'/>
        <license appli_prov= 'CNUM'/>
    </licenses >
    <data>
        <datum name= 'CAC40'descr= 'Valeur du CAC40'type= 'Streamed'
datatype= "Text"value= '6500'/>
        <datum name= 'IR.CAC50' descr= 'Valeur du IT.CAC50' type= 'Streamed'
datatype= "Text" value= '3600'/>
        <datum name= 'Nouveau M' descr= 'Valeur du Nouveau Marche' type=
'Streamed'datatype= "Text" value= '4500'/>
        <datum name= 'SBF120'descr= 'Valeur du SBF120' type= 'Normal'
datatype= "Text" value= '4300'/>
        <datum name= "LogoBDP" descr= "Logo de la bourse de Paris"
datatype=
```

-continued

```
"Picture" value= "logo.mpg"/>
    </data>
</content_provider>
```

These different data files will be sent by the Content Provider under the content Provider's own initiative.

The functionalities which will be described below are listed as follows:

definition and allocation of system resources by application creation of the reference for an external datum use of a reference in an editing tool broadcast of a data format using a reference broadcast of a referenced datum stopping of the broadcast of a referenced external datum stopping of an application using the references referenced external data suppression of the referenced data This list of functionalities will now be described.

Definition and Allocation of System Resources by Application:

This functionality permits the definition of the broadcast streams that are used for the transport of data. This operation takes place at the level of the service plan, and has as its goal the association of a particular PID to a data category. These streams can be made up of private MPEG tables and it is equally necessary to define the TID ranges. In principle, a TID value corresponds to a particular type of data (image, text).

This functionality may comprise the following actions:

definition of the data categories loading of information on the StreamLocators in the database of the reference system definition of the TID ranges for the different types of external data creation of a configuration file comprising a collection of types of data usable in the application frame and their correspondence with the transport elements of their reference.

This functionality permits the association to a datum of a unique reference, defined according to the normalised structure of the URI. This reference definition is created jointly between the Content Provider, the Programme Provider, and the Operator. The Operator, responsible for the storage and management of the references, must equally control the global volume of data broadcast by the application.

For each of the data, the following parameters are defined:

Stream Locator:
    this is the identifier of the XML file that will transport the data from its provider to the Operator.

DataLocator:
    this is the location of the data in the XML file. Its definition is based upon the Xpath or XML-Query principles of normalisation.

Logic descriptor:
    this description will permit the editing tool to identify clearly the referenced data.

Default value

Proprietor

Usage rights

Once this reference is defined, these parameters are stored at the level of the Operator who is then responsible for making them available to the authorised editing tool.

2.2.2.2 Actions

Selection of a datum

Identification of its type

Allocation to a Stream Locator

Generation of the Data Locator

Definition of the parameters of the reference

Storage of the URI and of its logic descriptor in the reference system of the operator Storage of the relation between a datum and its reference in the database of its creator (ie the Content Provider)

Use of a Reference in an Editing Tool:

This functionality permits the user of an editing tool, who wishes to use a referenced datum, to insert within his own application format, the reference (URI) to this datum.

To do this, it makes available a dedicated GUI permitting him to select a reference from a list. This list can be classified according to the type of data sought. The references are filtered according to the rights of the user. The GUI provides information equally on the broadcast state of the referenced datum.

Once the reference is selected, the URI property of the object responsible for displaying the corresponding datum is updated.

This functionality may comprise of the following actions:

update of the list of usable URIs to insert the URI at the level of the data format of the client application to select a referenced datum, from its logic descriptor, or directly from its URI to insert the URI at the level of the data format of the client application Broadcast of a Data Format Using a Reference:

This functionality allows a user to request the broadcast of his data format to the operator. To do this, the user sends his data files to the operator via a broadcast console. The user specifies certain parameters concerning the broadcast, such as the date and time of broadcast, as well as management rules, permitting control of the integrity of the format and of the data used. These rules notably define the conditions under which the format of an application is broadcastable. Typically, is it possible to broadcast in the case where certain data, linked to the data used in the format, are missing at the level of the broadcast system? The user is warned by the operator of the possibility of broadcast of his data format.

For each of the uses of a reference within the application format, a specific analysis will be carried out. It will permit the preparation of the destination XTVML container to receive the datum corresponding to it. This container will be filled with the associated Stream Locator and Data Locator, the Data Locator facilitating the retrieval of the datum corresponding to it. In addition, the idea of a default value mentioned above permits at this stage the broadcast of the filled container before having received the true value of the reference.

This functionality may comprise the following actions:

Broadcast Console Side:— to define the management rules regarding global coherence of the data to define the broadcast parameters (transport of stream, date and time)

to select the file(s) to broadcast via the broadcast console to send the file(s) to the Operator via the console Operator Side:— reception of the files; control of the broadcast rights and of the integrity of the collection of files to analyse the references used and to notify as necessary to the user the references necessitating the sending of the data for which he has declared himself responsible to apply the broadcast coherence rules at the level of the operator to notify to the user the level of coherence of his data creation of a container or reuse of an existing container for the references to the external data to convert the application from XTVML format to the MPEG format of the receiver/decoder broadcast of the application conversion and broadcast of the containers filled with the default values Broadcast of a Referenced External Datum:

This functionality permits the broadcast of the referenced datum To do this, the Content Provider transmits to the operator an XML file, the header of which contains the Stream Locator. This file equally contains the datum sent specifically to the site defined by the DataLocator of the URI (Xpath standard). An analysis of this file at the point of its reception by the operator allows, by examination of the StreamLocator, the recovery of the collection of containers lined to this value of Stream Locator. For each of the containers, the value of the DataLocator is analysed, and the value of the datum is recovered by means of the Xpath technology. This value is then inserted within the container, which is finally converted to MPEG format then sent to the SBI.

This functionality may comprise the following actions:

to receive the file from the Content Provider control of broadcast rights to analyse the Stream Locator of the file to request the list of containers linked to this Stream Locator to read the Data Locator of each container and to recover the value of the datum via Xpath to insert the value corresponding to the URI within the container to convert the XTVML container to the MPEG format of the receiver/decoder to send the MPEG file to the SBI Stopping of the Broadcast of a Referenced External Datum:

This functionality permits the Content Provider providing a datum to request the stopping of its broadcast. In this case, one re-broadcasts the container associated with the datum having previously inserted the default value of the datum.

This functionality may comprise the following actions:

to select the datum to no longer be broadcast, via the broadcast console to replace the datum by the default value in the containers using this reference to re-broadcast the modified containers to notify the users of the URI of the stopping of the broadcast of the datum, and of the re-broadcast of the default value.

Stopping of a Scenario Using a Reference to an External Datum:

This functionality permits the application controller to request the stopping of the broadcast of the MPEG tables that make up a broadcast scenario. The broadcast management system lists this collection of MPEG tables and analyses whether each of them is used by other applications in the process of being broadcast. According to the situation, a notification system will warn the requester of the stopping of the broadcast, of the impossibility of satisfying his request, or the MPEG table will be removed from the broadcast stream In the case of MPEG tables linked to XTVML containers, one will remove both the container and the links to the reference that it contains.

This functionality may comprise the following actions:
to select the scenario to no longer be broadcast via the broadcast console
to analyse the eventual use by other applications, of the MPEG tables
to notify the case where an MPEG table cannot be removed from the stream
to stop the broadcast of the corresponding private tables
to remove the associated filled containers
Removal of a Reference to a Datum:

This functionality permits the proprietor of a reference to remove it. The referenced datum can be considered to have previously been removed from the broadcast stream, implying a control over the broadcast of the datum concerned.

Another control is used in the case where the reference is shared or shareable. The proprietor of the reference is warned of its eventual use by other applications. He can then give a warning not to use this reference and then either wait for a green light for each, or set a precise date and time for the removal of the reference. The request for removal can in this way be differentiated.

The specifically sent command for the removal of a reference consists of removing all trace of relation between the datum, its URI, its usage rights and its logic descriptor.

This functionality may comprise the following actions:
selection of a reference
analysis of the broadcast of a corresponding datum
analysis of the use of this reference by applications
notification of use
confirmation of the date and time of removal
removal of all elements related to this reference.
Technical Presentation General Scheme:
This is shown in FIG. 8.

Figure 8:
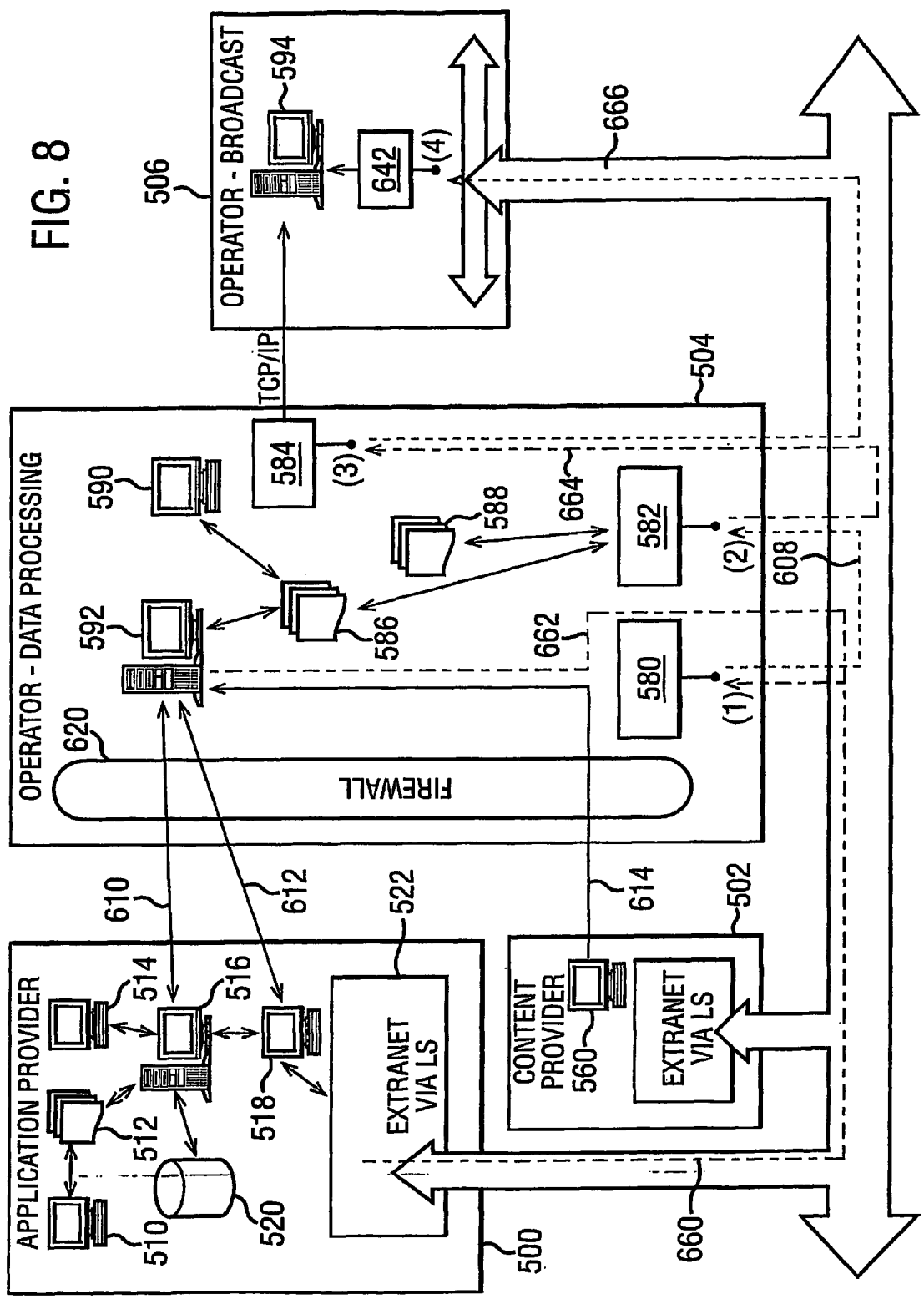
FIG. 8 is ageneral overview, showing certain components of a system, various connections between them, and various data streams.

FIG. 8 is a general overview, showing certain components of a system, various connections between them, and various data streams. In particular, an Programme Provider 500, a Content Provider 502, an Operator 504, and a Broadcast Centre 506 are shown.

The Programme Provider comprises an offline tool 510 linked to a storage device 512, an editing tool 514, a web server application 516, a broadcast console 518, a data storage device 520 and an Extranet device 522. Various connections 530, 532, 534, 536, 538, and 540 between these components of the Programme Provider are shown. The on-line editor, along with an off-line editor, makes up part of the editing tool.

The Content Provider 502 comprises a broadcast console 560, and an Extranet device 562.

The Operator comprises a reception service 580, a URI-XTVML processing service 582, a broadcast service 584 a database for the storage of URIs 586, a database for the storage of containers 588, a URI editor 590, and a Web server 592. Various connections 600, 602, 604, 606, and 608 between these components of the Operator are shown.

Also shown are connections 610, 612, and 614 between the Web server 592 and the web server application 2516 of the Programme Provider 2500, the broadcast console 2518 of the Programme Provider 2500, and the broadcast console 2560 of the Content Provider 2502 respectively. Security is assured by a firewall 620 at the Operator 2504.

The broadcast centre comprises an SBI 640 and a reception service 642. A TCP/IP connection links the SBI 640 to the broadcast service 2584 of the Operator 2504.

Data streams 660 (stream (1)), 662 (stream (2)), 664 (stream(3)) and 666 (stream (4)) that travel between various components of the system when in operation are shown. The data streams are discussed in more detail below.

Aspects of the system shown in the general overview will now be discussed in more detail.

The aim of this architecture is to permit all the participants to communicate easily and efficiently. Globally, three participants communicate between themselves for the broadcast and the resolution of the external references. These participants are the Programme Provider, the Content Provider and the Operator. The role of each is described in the first part of this document.

Taking into account what already exists, the most intuitive solution is that which is based on COM technology, and on the HTTP protocol for communication The exchange of files is carried out by a Web server, providing simple access whatever the architecture of the client. A single web browser permits access to the necessary data.

The role of the Programme Provider is to construct and to send to the Operator a collection of data describing an interactive application.

For editing, the Programme Provider has at its disposal an editing tool accessible via a Web browser and an Offline tool offering greater editing functionality. It is up to the Programme Provider to choose the architecture that suits bin best.

For broadcast, a dedicated console permits the transmission to the Operator of the application data to be broadcast in XTVML format.

The Content Provider broadcasts to the Operator the raw data in a predefined XML format (see above). This broadcast is carried out with the aid of broadcast console. This console is a reduced version of that used by the Programme Provider. It uses therefore the same communication modes. One will be able to link a scheduler to this tool to permit the broadcast of data at regular time intervals.

The principal roles of the Operator are:
1. Reception and processing of the data This processing includes the resolution of external references.
2. Broadcast of the data The task of reception and transmission of the data is separated into three distinct modules.
A reception service which has the role of receiving data from the Content Provider and from the Programme Provider, and of transferring them to another module after integrity and security controls.
A processing service looks for references to external data and attempts to resolve these logical references by physical references. To do this, a database is used that stores the URIs in the course of being used as well as a database that serves to store the containers. A container is an XTMLV container destined to receive an external datum from the Content Provider.
A broadcast service. Its role is to convert the application in XTVML format into the MPEG format of the receiver/decoder then to transmit the data to the SBI server.

The broadcast of data will be assured by the SBI that receives data in MPEG format and broadcast parameters and transmits these data to a broadcast centre.

Properties of the Data Stream will now be discussed in more detail.

In the transmission of information from the Programme Provider to the Operator, it is the role of the broadcast console to transmit the data to the Operator. This console is able to communicate via a Web server (HTTP/XML). Security between the two networks is assured by a firewall at the Operator. The Web server at the Operator has the task of receiving the data in XTVML format and transmitting it to the reception service.

The editing tool of the Programme Provider can also receive the data coming from the Operator. Typically, it receives the list of URIs that it has the right to use. This information will be transmitted to it via the same web server as that which is responsible for recovering the references appropriate to the client.

In the transmission of the information form the Content Provider to the Operator, the broadcast console used by the Content Provider is a reduced version of the console that is found at the Programme Provider.

Figure 9:
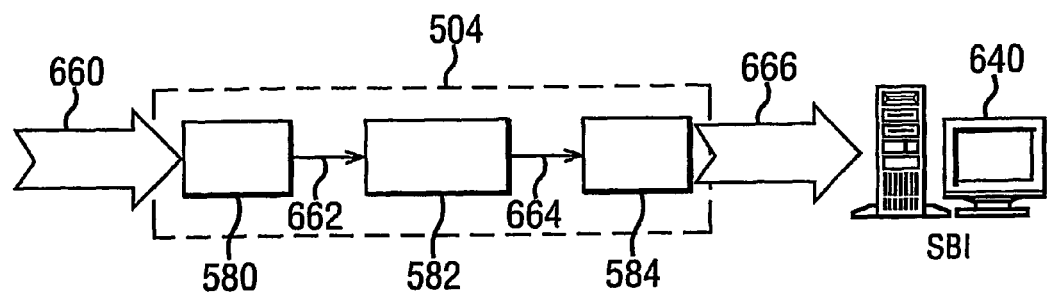
FIG. 9 illustrates the passage of data through the system of FIG. 8 in more detail.

FIG. 9 illustrates the passage of data through the system of FIG. 8 in more detail.

In the transmission of information from the Operator to the broadcast centre, the reception service receives the data in XTVML format (stream (1) in the Scheme). These data come directly from a client used at the Providers, or from a Web server that then serves as a link.

These data are analysed then retransmitted to the URI-XTVML processing service (stream (2) in the Scheme) if the integrity and security controls are positive. This 'processing service' server will resolve the external references and if all are resolved, all of the XTVML stream is transmitted to the broadcast service (stream (3) in the Scheme). This broadcast Service transforms these XTVML data to MPEG format destined for the receiver/decoder then communicates via a (TCP/IP) socket with the SBI server.

Hereafter are presented detailed specifications in relation to the Data Exchanger functionality that is the module responsible for the resolution of data references within XTVML files and of the application.

For each of the usage cases described within this document, a general Use Case diagram is presented as well as a sequence diagram. Each action will then be detailed and concrete examples of the manipulation of data will be given.

In the context of the application framework, the notion of referencing data may play a key role, in the sense that it allows the content of data (text or image) to be clearly disassociated from its presentation on the screen. To assign a datum, the editing tool (Programme Provider) uses a URI (Uniform Resource Identifier) which inserts into the XTVML format the object which it must display. At this end, the Content Provider has the role of sending files containing the data and declaring them with the aid of their URI. The Data Exchanger is itself responsible for the MPEG conversion and the broadcasting of XTVML objects and external data. Furthermore, it is responsible for inserting the referenced data into the XTVML objects, this mechanism not being possible to implement at the level of the receiver/decoder because of its limited processing capacity.

Figure 10:
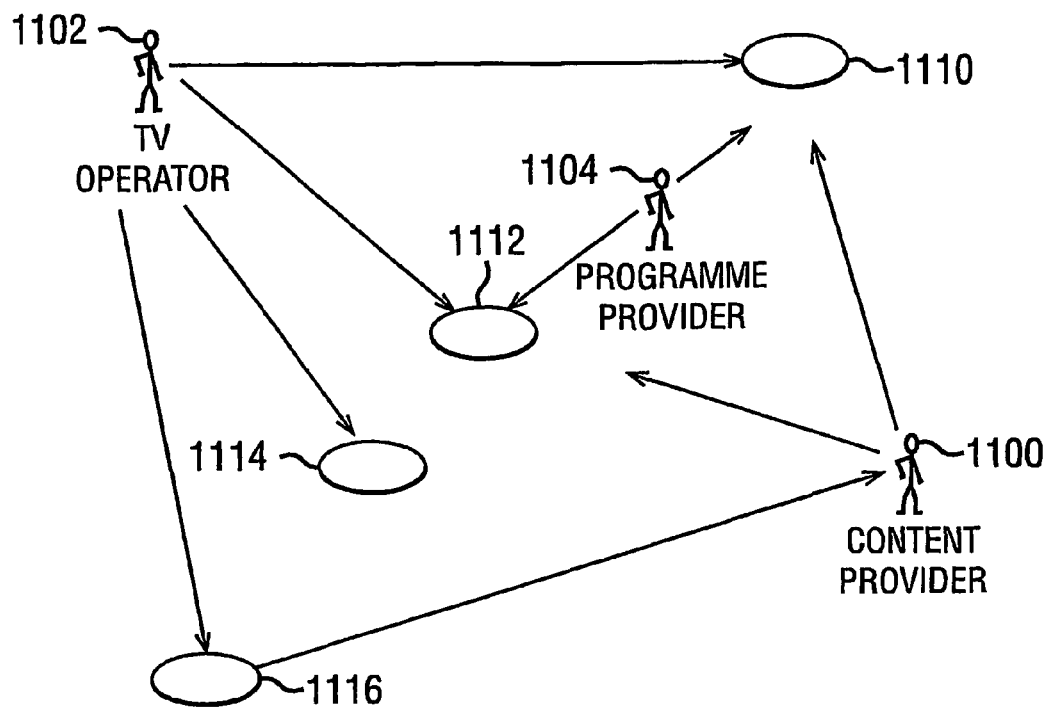
FIG. 10 is a general diagram illustrating the definition and implementation of the system resources by application.

Usage cases will now be described; firstly the definition and employment of system resources by the application:

FIG. 10 is a general diagram illustrating the definition and implementation of the system resources by application. In particular, and as described below, it illustrates the relationship between a Content Provider 1100, TV Operator 1102 and a Programme Provider 1104, and various concepts or processes comprising a definition of categories of data 1110, definition of the usable pass band 1112, technical configuration of the broadcast 1114 and an allocation of StreamLocators 1116.

Figure 11:
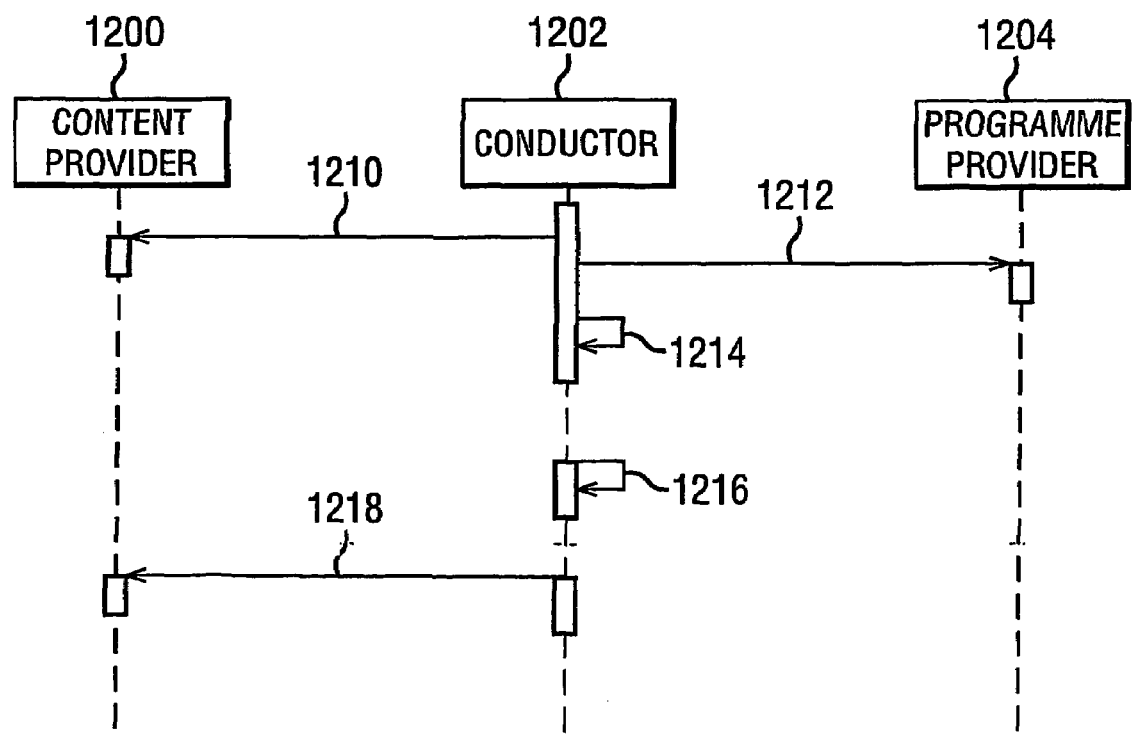
FIG. 11 is a sequence diagram also relating to the definition and implementation of the system resources by application.

FIG. 11 is a sequence diagram also relating to the definition and implementation of the system resources by application. The relationship between a Content Provider 1200, TV Operator 1202 and Programme Provider 1204 is again illustrated, and the sequence of events comprising a definition of categories of data 1210, 1212, a definition of the pass band 1214, technical configuration of the broadcast 1216 and an allocation of Stream Locators 1218 is also shown.

The above features relating to the definition of the categories of data, the definition of a required pass band and the technical configuration of the broadcast will now be described in more detail.

The Content Provider determines the categories of data which is brought to the Operator. These categories can be linked to data types, but equally to subject matter or themes. These are in fact the broadcast constraints which dictate the definition of these categories (physical origin of the data, broadcast frequency, collection of data corresponding to the same usage rights).

With respect to the Programme Provider data, the Operator can consider that it therefore follows on to use the entirety of the different XTVML objects in the majority of cases.

An important parameter in the context of an application using external data resides in forecasting the volume of this data which is simultaneously broadcast. It is thus necessary to know the maximum volume of data to broadcast, as well as the Content side of the Programme Provider. To do this, the Programme Provider has at its disposal a module to calculate the global volume of files constituting a scenario, which allows it to control the size of a scenario which it creates. The Data Exchanger itself is in charge of controlling the broadcast level bit-rate.

Technical configuration of the broadcasting: the goal of this stage is to store within an XML file, 'Diffusions.xml', the collection of parameters necessary for the broadcast of all the tables relating to an application of this type. To do this, one declares a collection of technical parameters concerning the broadcast of each datum This collection of data is contained in a <diffusion> element identified by the value of the attribute 'diff_id'. It is important to note that the file 'Diffusion.xml' comprises as many different <broadcast> blocks as there are types of broadcast for an application. Typically, an application can have 2 broadcast channels: the first for internal tests, and the second for real broadcasts.

With respect to the Sections Broadcast Injector: the first point essentially, for the Operator, in view of the categories of data defined previously, consists in affecting one or more SBI for the broadcast. For each of these, it is necessary to monitor and to regulate the flow in an optimal manner.

One obtains, for example, the following list for the file 'Diffusion.xml':

```
<diffusions>
    <diffusion diff_id = "mag+_test">
        <sbi sbi_id="1" ip="150.1.2.3" port="1"/>
        <sbi sbi_id="2" ip="150.1.2.3" port="2"/>
    </diffusion>
</diffusions>
```

One will note the presence of an attribute 'sbi_id' used in the set of files to identify uniquely an SBI.

With respect to the PID, one defines as follows the number of the PID usable in each SBI:

```
<diffusions>
    <diffusion diff_id="mag+_test">
        <sbi sbi_id="1" ip="150.1.2.3" port="1"/>
        <sbi sbi_id="2" ip="150.1.2.3" port="2"/>
        <pid_data sbi_id="1" pid="3207">
        </pid_data>
        <pid_data sbi_id="1" pid="3208">
        </pid_data>
        <pid_data sbi_id="2" pid="4502">
        </pid_data>
    </diffusion>
<diffusions>
```

With respect to the TID and cycle time, finally, the table types are linked to a particular TID value, in a particular PID, that gives, as a concrete example for the collection of XTVML objects:

```
<diffusions>
    <diffusion diff_id="mag+_test">
        <sbi sbi_id="1" ip="150.1.2.3" port="1"/>
        <sbi sbi_id="2" ip="150.1.2.3" port="2"/>
        <pid_data sbi_id="1" pid="3207">
            <object type="main_screen" tid="150" period="10"/>
            <object type="lut" tid="151" period="10"/>
            <object type="screen" tid="152" period="10"/>
            <object type="object" tid="153" period="10"/>
        </pid_data>
        <pid_data sbi_id="1" pid="3208">
            <object type="picture" tid="154" period="20"/>
            <object type="pixmap" tid="155" period="20"/>
        </pid_data>
        <pid_data sbi_id="2" pid="4502">
            <object type="text" tid="156" period="20"/>
            <object type="label"_list" tid="157" period="20"/>
        </pid_data>
        <pid_data sbi_id="2" pid="4503">
            <object type="streamed_picture" tid="157" period="20"/>
        </pid_data>
    </diffusion>
</diffusions>
```

This file once updated is stored by the Operator in the index of data of the application concerned.

Creation of a Reference to a Datum

The creation of the reference to a item of data will now be described.

FIG. 12 is a general diagram illustrating the creation of a reference to a datum In particular, the relationship is illustrated which exists between a Content Provider 1300, Programme Provider 1304 and Data Exchanger 1306; and the various processes of: creating or selecting a file which contains the reference 1310, naming the item of data 1312, logical description 1314, selection of an item of data to reference 1316, defining the usage rights 1318, sending the file 1320, storing the references 1322, and sending the references 1324.

Figure 13:
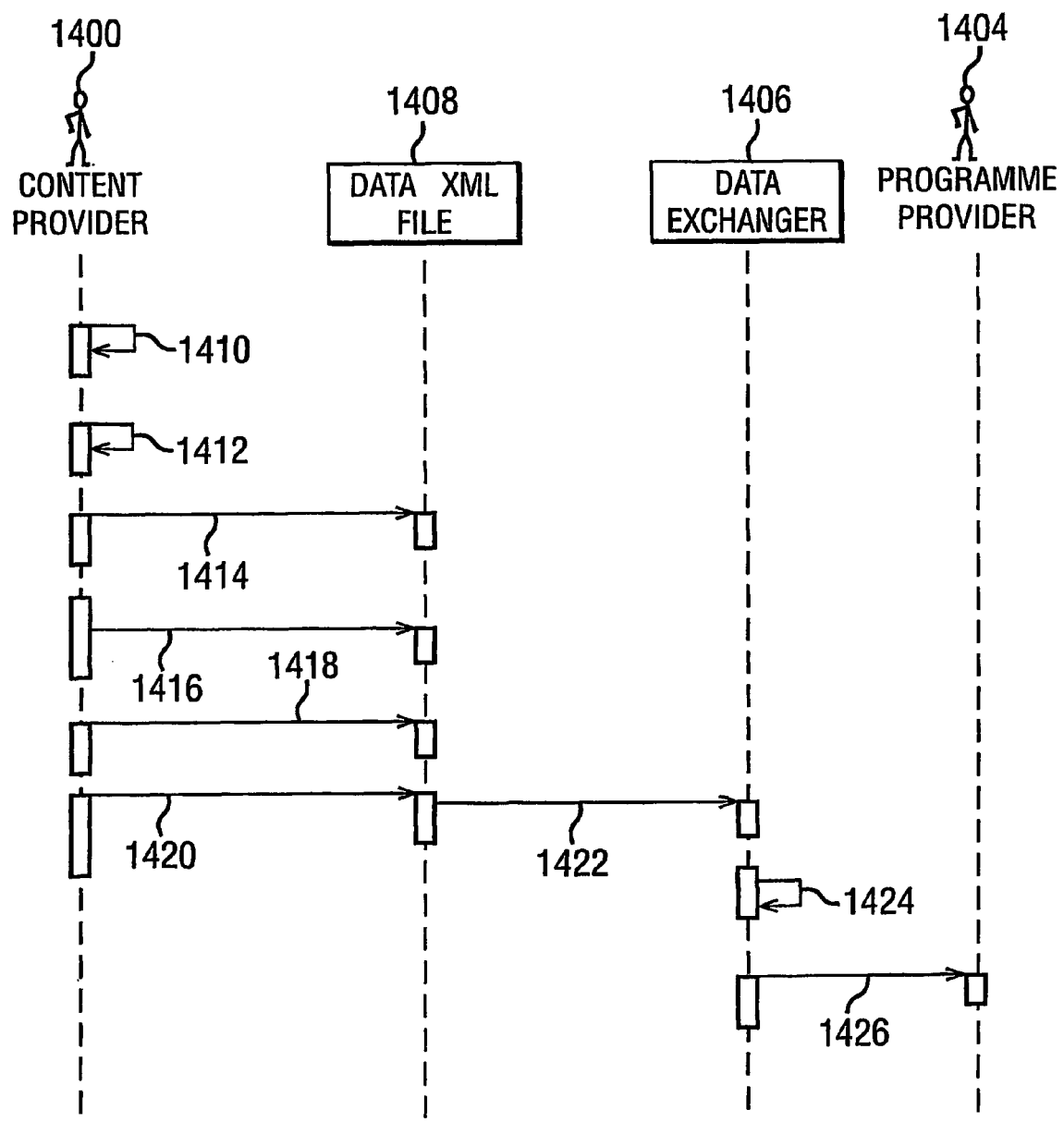
FIG. 13 is a sequence diagram also illstrating the creation of a reference to a datum.

FIG. 13 is a sequence diagram also illustrating the creation of a reference to a datum. The sequence of events relating to a Content Provider 1400, Programme Provider 1404, Data Exchanger 1406 and XML data file 1408 is shown, the events in particular comprising; selecting an item of data 1410, allocating a Stream Locator 1412, selecting or creating an XML file for the transport of references 1414, inserting the reference and its attributes into the XML module 1416, definition and inserting the usage rights 1418, validation 1420, sending a file 1422, storage 1424, and filtering the rights and sending 1426.

Features relating to selecting a datum; allocating a Stream Locator, selecting or creating an XML file for the transport of references; inserting the reference into the module; describing the data; defining the usage rights; sending the XML file; storing the reference; and filtering and sending the XML file to the editing tool of the Programme Provider will now be described in more detail.

Selection of a datum: the Content Provider, before anything else, decides upon the collection of data to be referenced. This decision may be taken jointly, in part with the Programme Provider who is going to have to integrate it into the scenario, and in part with the Operator who will approve the amount of data to broadcast in terms of bandwidth.

Allocating a Stream Locator: the item of data is associated with one of the Stream Locators allocated to the Content Provider. To do this, the Content Provider possesses the list of its Stream Locators, and selects one amongst them.

Selecting or creating an XML file for the transport of references: to each Stream Locator there corresponds a unique 'Reference_Definition.xml' file for which the root element possesses a 'stream_locator' attribute having its value. This file is used in the definition of the references to describe the collection of their parameters, but equally to positively send the associated data to the references.

Its structure is as follows:

```
<reference_definition provider_name="Bourse_de_Paris"
    date+"05/10/2000">
    <licenses>
        <license appli_id+""/>
    </licenses>
    <data stream_locator="Bourse_de_Paris/news"
        start_date="05/10/2000">
        <datum data_locator="" descr="" datatype=""
            frequence="" width=""
            height="">
            <![CDATA[contenu]]>
            ..........
            ou
            ..........
            bloc XML
        </datum>
    </data>
</reference_definition>
```

The elements will now be described: -
<licenses>: it contains the <license> elements that possess an 'appli_id' attribute indicating the identifier of an application or of a Programme Provider authorised to use the references contained in the file. One finds as many <license> elements as there are applications authorised to use these references.

<data>: it contains as many <datum> elements as data referenced in the file.

<datum>: it possesses several attributes. 'data_locator' contains the value complementary to the Stream Locator to constitute the URI of the datum 'descr' contains the logical description of the datum 'datatype' specifies if it is a datum of the editorial data list type, an MPEG image or a block of text (respectively 'datalist', 'picture' or 'text'). 'frequency' specifies if the datum is sent with a high frequency or not ("Streamed" or "Normal"). This attribute indicates in fact whether the decoder must examine the versions of the XTVML object containing the broadcast datum, so as to refresh directly the screen without action via the remote control unit. In the case where the reference datum is an image, the Content Provider must equally provide the image dimensions, ie the 'width' and 'height' attributes.

CDATA section: it contains the default value of the datum, either the gross text block, or the name of the file containing the MPEG image. This allows an XTVML object referencing a datum to be able to display the content of its first broadcast which may be the default values. For these reasons, this value must be filled, otherwise the reference is entirely rejected by the Data Exchanger and the default values will be used.

XML Block: in certain cases where the objects reference a list of URIs, the XML block is composed of different sub-elements describing each of the URIs. A use of type Xpath or XMLQuery then allows the navigation in this block in order to rapidly locate the values of the URIs. One distinguishes two types of data list. The first is of type 'DataList', and corresponds to the PageSet object:

The <datum> element possesses several elements <title>, <body>, <picture>, and <picture_legend>. Each of these elements contains an element of type Section Data representing the content of the referenced datum.

The second is of type 'catalogue', and corresponds to the Menu object:

```
<datum data_locator="menu_foot" descr="liste des données du foot" datatype="catalogue" frequence="normal">
    <data_item>
        <item_legend>
            <![CDATA[Résultats de la D1]]>
        </ item_legend>
        <item_label>
            <![CDATA[Résultats D1]]>
        </ item_label>
        <title>
            <!CDATA[Résulats de la D1: journée du 12/12/00]]
        </title>
        <body>
            <![CDATA[............................................................]]>
        </body>
        <picture_name>
            <![CDATA[............................................................]]>
        </picture_name>
        <picture_legend >
            <![CDATA[......................]]>
        </picture_legend >
    </data_item>
    < data_item>
        <item_legend>
            <![CDATA[Fernandez au PSG]]>
        </ item_legend>
        < item_label>
            <![CDATA[Fernandez au PSG]]>
        </ item_label>
        <title>
            <![CDATA[[............................]]>
        </title>
        <body>
            <![CDATA[............................................................]]>
        </body>
        <picture_name>
            <![CDATA[............................................................]]>
        </picture_name>
        <picture_legend>
            <![CDATA[......................]]>
        </picture_legend>
    </ data_item>
</datum>
```

One notes here the presence of several <item> elements that each contain the same types of data as previously, and also the caption and the layout of the corresponding menu.

Insertion of the reference element: a reference element is in fact represented by a <datum> element contained in the <data> element of the XML file. Every declaration of a new files coming from the Content Providers will, a priori, all therefore be usable by the Programme Provider.

Sending of the XML file: once the collection of parameters are updated, the XML file is stored by the Operator. One can propose by way of example the file 'Reference_definition.xml':

```
<reference_definition provider_name="Bourse_de_Paris"date="05/10/2000">
        <licenses>
                <license appli_id="mag+"/>
        </licenses>
        <data stream_locator="Bourse_de_Paris/news"start_date="05/10/2000">
                <datum data_locator="CAC40"descr="Valeur du CAC40"frequence="Streamed" datatype="datalist">
                        <title>
                                <![CDATA[Résultats de la D1:journée du 12/12/00]]>
                        </title>
                        <body>
                                <![CDATA[............................................................]]>
                        </body>
                        <picture_name>
                                <![CDATA[............................................................]]>
                        </picture_name>
                        <picture_legend>
                                <!CDATA[....................]]>
                        <picture_legend>
                </datum>
                <datum data_locator=SBF120" descr="Valeur du SBF120"frequence ="Normal"datatype ="catalogue">
                        <data_item>
                                <item_legend>
                                        <![CDATA[Résultats de la D1]]>
                                </ item_legend>
                                < item_label>
                                        <![CDATA[Résultats D1]]>
                                </ item_label>
                                <title>
                                        <![CDATA[Résultats de la D1:journee du 12/12/00]]>
                                </title>
                                <body>
                                        <![CDATA[............................................................]]>
                                </body>
                                <picture_name>
                                        <![CDATA............................................................]]>
                                <picture_name>
                                <picture_legend>
                                        <![CDATA[....................]]>
                                </picture_legend>
                        </ data_item>
                </datum>
                        <datum data_locator="logo" descr="Logo de la bourse de Paris"frequence ="Normal"datatype ="picture" width="200" height="150">
                                <![CDATA[logo.mpg]]>
                        </datum>
                </data>
</reference_definition>
``` reference by the Content Provider in this way accompanies the insertion of a <datum> element in the 'Reference_definition.xml' file loaded in memory. It then updates the collection of attributes of this element.

Datum description: the <descr> attribute is updated with the text briefly describing the datum.

Definition of the usage rights: this stage consists of inserting a <license> element for each application or Programme Provider authorised to use the datum. It is the <appli_id> attribute that is updated with the identifier of the using application.

It is important to note that the rights are managed for all the file references, and not at the level of the individual data. On the other hand, the first version of Data Exchanger is destined to be used by only one application at a time. The It equally maps each of the <datum> elements to the description of their corresponding datum, so as to be able to update the XML file correctly during the successive sendings with the help of the refreshed datum.

The Content Provider is then able to send the 'Reference_definition.xml' file thus created to the Operator, via the HTTP protocol (request of 'post' type). In the two cases, a strict authentication of the Content Provider will allow the authorisation of the Data Exchanger to take into account the file containing the list of references.

Storage of the reference: upon reception of the 'Reference_definition.xml' file by the WEB server of the Data Exchanger, each <datum> element is analysed. One then reconstructs the URI of the reference by concatenating the value of the 'stream_locator' attribute of the root element with that of the 'data_locator' attribute of the <datum> elements. One then inserts a <reference> element in the 'References.xml' file under the <application> element that possesses an 'appli_id' attribute equal to one of the values of the same attribute of the <license> elements of the 'Reference_definition.xml' file. This <reference> element possesesa 'uri' attribute that contains the reconstructed URI, an attribute 'descr' that retakes the logical description, and finally in the case of images, the two dimensions attributes 'width' and 'height'. In addition, it contains a CDATA section that represents the default value of the datum In retaking the references declared in the earlier 'Reference_definition.xml' file, one obtains:

```
<references>
    <application appli_id="mag+">
        < reference uri="canal+/foot"descr="...."/>
            ........................
        </ reference >
        <reference uri="bourse_de_paris/news"descr="...."/>
            ........................
        </ reference >
                <reference uri="cinema/image_
                matrix"descr="...."width="200"
height="150"/>
                    <![CDATA[logo1.mpg]]>
        </ reference >
    </application>
    <application appli_id="bn">
            .......................................
    </application>
</references>
```

This 'References.xml' file is stored by the Operator in the index of references. This file is unique and contains the collections of references declared by all of the Content Providers.

Filtering and sending the XML file to the editing tool of the Programme Provider: in order to send the list of usable references to an editing tool, it is initially advisable to apply a filter to the 'References.xml' file, selecting only the XML block of the <application> element that possesses the correct value of its 'appli_id' attribute.

The default values of the references are thus transmitted to the Programme Provider which will be able to present them through the editing tool. The files corresponding to images are also transmitted. For these, an iterative reading of the value of the CDATA section of the elements of 'picture' type enables the obtaining of the name of the image file and the sending of it to the Programme Provider.

Broadcast of a Scenario

The broadcast of a scenario will now be described in more detail.

Figure 14:
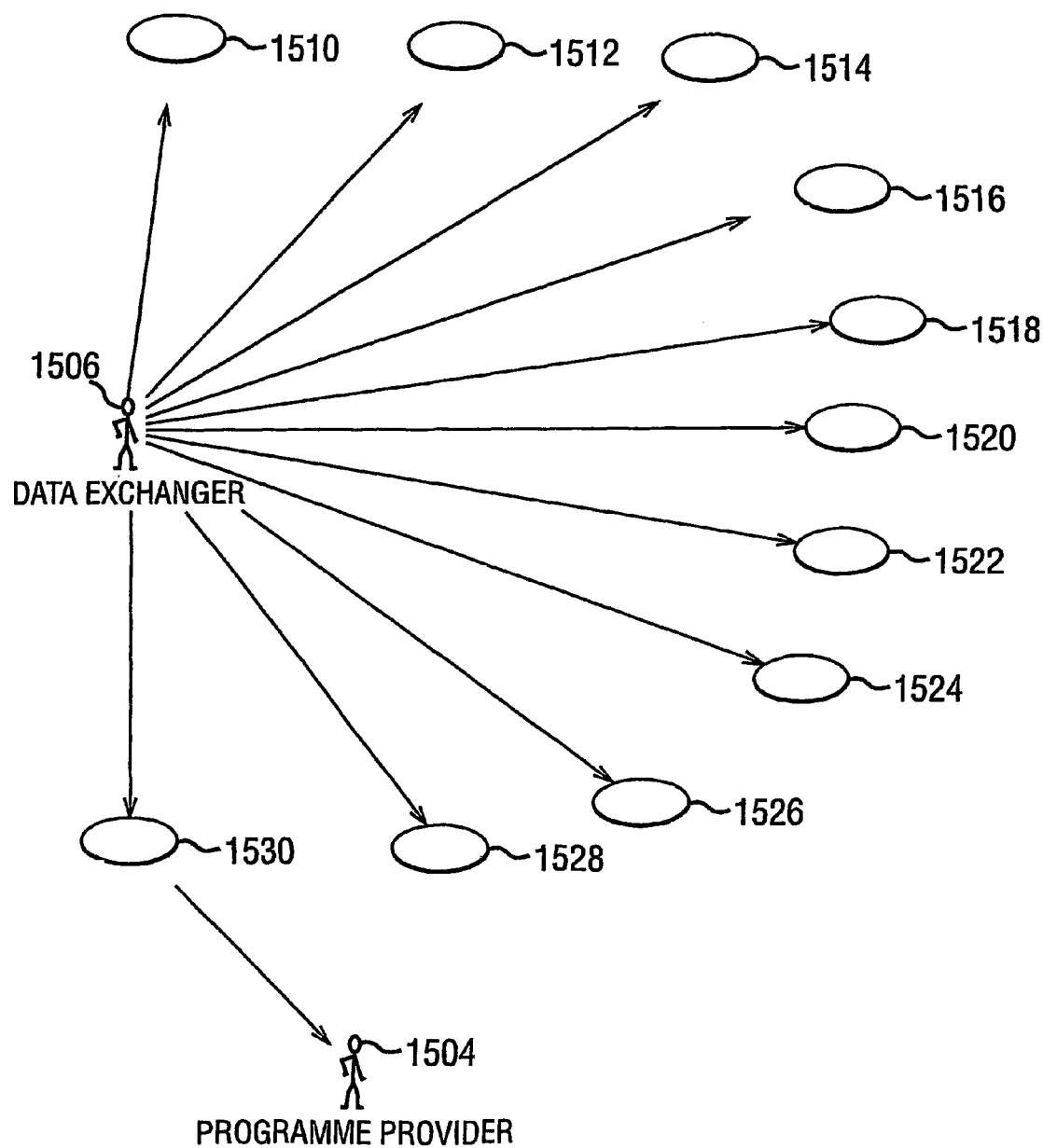
FIG. 14 is a general diagram illustrating the broadcast of a scenario.

FIG. 14 is a general diagram illustrating the broadcast of a scenario. A Programme Provider 1504 and Data Exchanger 1506 are shown, as well as related processes comprising receiving scenario files 1510; reading the data Operator 1512; reading the XTVML files 1514; replacing the URIs of the XTVML object with their SBI parameters 1516; replacing the URIs of the data with their SBI parameters 1518; creating data containers with the default values 1520; updating the data conductor with the information 1522; converting the XTVML files into MPEG format 1524; broadcasting the MPEG tables 1526; eventually stopping the objects of the previous scenario 1528 and sending notification of the broadcast 1530.

Figure 15:
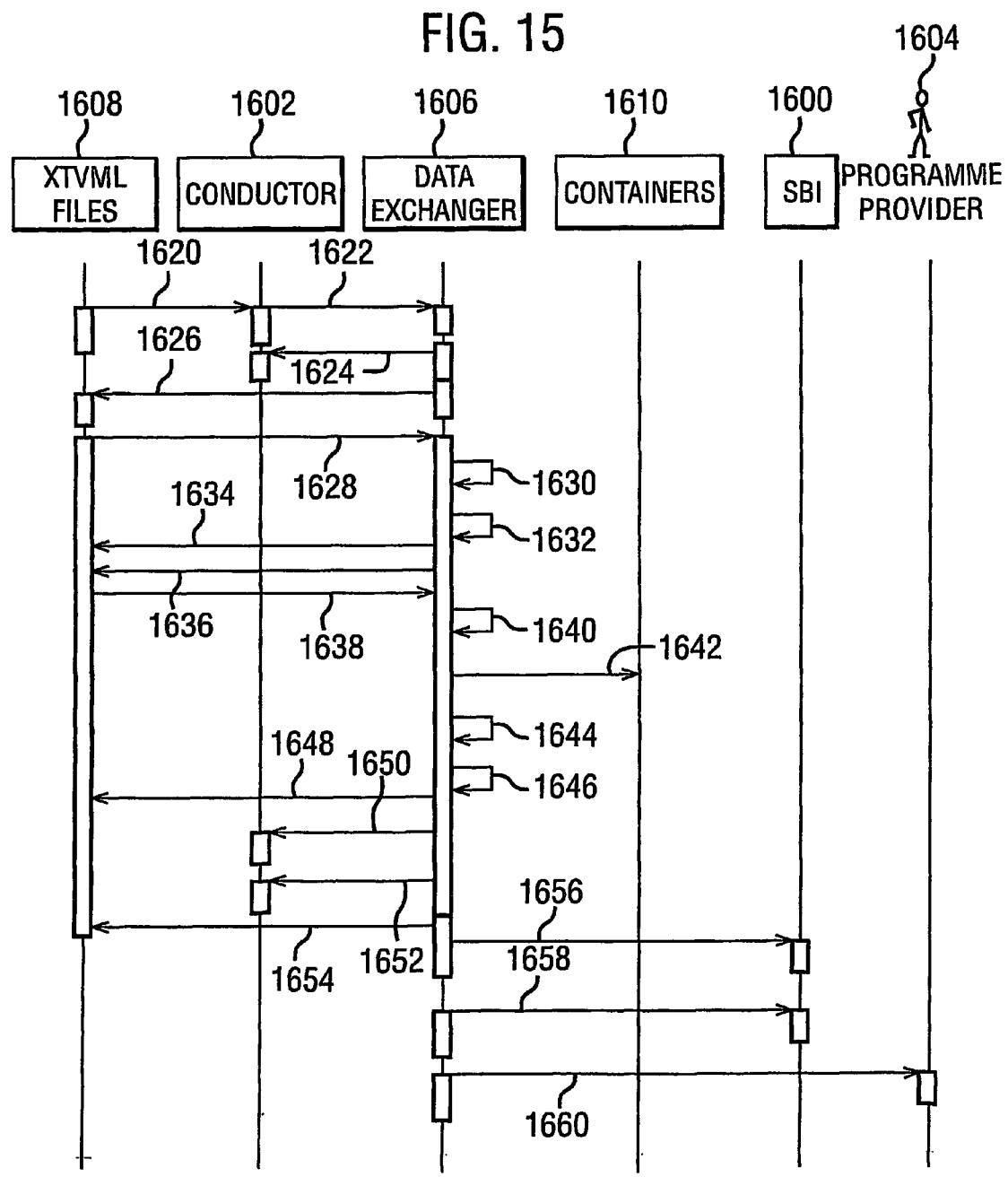
FIG. 15 is a sequence diagram also illustrating the broadcast of a scenario.

FIG. 15 is a sequence diagram also illustrating the broadcast of a scenario. The sequence of events relating to an SBI 1600, an Operator 1602, a Programme Provider 1604, a Data Exchanger 1606, XTVML files 1608, and containers 1610 is shown, the events in particular comprising, insertion 1620, sending 1622, identification 1624, reading of the URI of the file 1626, loading of the XTVML file 1628, analysis of the URI 1630, assignment of the broadcast parameters 1632, replacement of the URI by the broadcast parameters 1634, reading of the contents of an XTVML object file 1636, sending of the URI of the referenced data unit 1638, analysis of the URI 1640, creation of an associated container of the type of the data unit 1642, insertion of the default value 1644, assignment of the broadcast parameters 1646, replacement of the URI by the broadcast parameters 1648, insertion of the container file in the Operator, reading [searching for finished URI] 1652, MPEG conversion 1654, transfer of MPEG table 1656, stopping of the broadcast of objects of the previous scenario 1658, and notification 1660.

Features relating to receiving scenario files, identification, reading elements of the data Operator, analysis of the URI of an XTVML object and assignment of broadcast parameters, replacement of the URI by the broadcast parameter, reading of the content of an XTVML object file, creation and modification of a container, attribution of broadcast parameters, replacement of the URI by broadcast parameters, insertion of the default value, insertion of a container within the data Operator, MPEG conversion of XTVML files, transfer to the SBI, stopping of the broadcast of objects from an earlier scenario, and notification will now be described in more detail.

Receiving the files of a scenario: a scenario is made up of different XTVML files that are stored in a unique XML file. This operation is located at the level of the editing toot This file named 'Conductor.xml' is made up of as many <table> elements as there are XTVML files in the scenario. With each of these <table> elements, one associates a 'uri' attribute permitting the unique distinguishing of the files, as well as a sub-element of type CDATA section that contains the whole of the XTVML file concerned.

This conductor has the following form:

```
<conductor appli_id="mag+"diff_id="mag+_
test"name='test1'start_date="01/10/2000
20:00">
        <table uri="mag+/screen_1"/>
        < table uri="mag+/menu_1"/>
        <table uri="mag+/menu_2"/>
        <table uri="mag+/pict_1"/>
        <table uri="mag+/pict_2"/>
    </conductor>
```

It is this file that is transmitted to the Data Exchanger by a Push system, via HTTP by the editing tool Upon its reception, this file is loaded in the memory DOM, then analysed.

Other files can equally be sent to the Data Exchanger, these are the MPEG images corresponding to the default images used in certain XTVML objects. These files are sent directly to the Data Exchanger, and stored in a repertoire specific to the client application, under a particular name declared by this same client.

In the case where a 'Conductor.xml' file exists already for the application (i.e. a scenario is in the course of being broadcast), such existing file is renamed 'Conductor-.old.xml'. The usefulness of this action is described below.

Identification: once the Operator of the data loaded in memory by means of an XML parser, a first stage will consist of the analysis of its provenance, known by the reading of the 'appli_id' attribute that gives information on the identity of the proprietor application of the data.

```
<conductor  appli_id="mag+"diff_id="mag+_
test"name='test1'start_date="01/10/2000
20:00">
```

This identifier is then stored in memory.

Reading of the elements of the data conductor: this iterative action consists of reading each of the <table> elements of the conductor, and more directly, loading in DOM the contents of the XML file thanks to value of the 'uri' attribute. The reading of the 'uri' attribute allows in addition, in view of its Stream Locator, to know its XML object type.

<table uri="mag+/screen_1"/>

Analysis of the URI of an XTVML object, and assignment of broadcast parameters: in assessing the 'Diffusions.xml' file, one isolates the XML block related to the <conductor> element that possesses a value of the 'diff_id' attribute equal to that of the 'diff_id' attribute of the <conductor> element of the 'Conductor.xml' file. One then retrieves the first of the two items of data necessary for the identification of this object in the broadcast stream, to know its TID. To do this, one looks for the 'object' element that has a value of the 'type' attribute equal to that found in the Stream Locator of the URI of the object. The TID is then obtained upon reading the value of the 'tid' attribute.

```
<diffusions>
    <diffusion diff_id="mag+_test">
        <sb sbi_id="1"ip="150.1.2.3"port="1"/>
        <sbi sbi_id="2"ip="150.1.2.3"port="2"/>
        <pid_data sbi_id= ="1"pid="3207">
            <object type="main_screen"tid="150"period="10"/>
            <object type="lut"tid="151"period="10"/>
            <object type="screen"tid="152"period="10"/>
            <object type="object"tid="153"period="10"/>
        </pid_data>
        <pid_data sbi_id="1"pid="3208">
            <object type="picture"tid="154"period="20"/>
            <object type="pixmap"tid="155"period="20"/>
        </pid_data>
        <pid_data sbi_id="2"pid="4502">
            <object type="text"tid="156"period="20"/>
        </pid_data>
    </diffusion>
</diffusions>
```

The TIDExt is itself generated by an internal counter, reset at zero at the start of each new scenario reception.

Replacement of the URI by the broadcast parameters: in the header of the XTVML object file, one removes the 'uri' attribute, and one inserts two new 'tid' and 'tidext' attributes, having the values obtained in the preceding stage. This modification is stored within the element of type CDATA Section in the received 'Conductor.xml' file.

An example for an XTVML file of Screen object follows:

- Before:
```
<screen uri="mag+/screen:1">
    <screen_private_data>
    ................................
    ................................
    </screen_private_data>
</screen>
```
- After:
```
<screen tid="152"tidext="1">
    <screen_private_data>
    ................................
    ................................
    </screen_private_data>
</screen>
```

Reading the contents of an XTVML object file: with the contents of an XTVML file being loaded in DOM, an iterative analysis allows every use of a data reference to be identified. To do this, each of the elements possessing a 'uri' attribute is searched for. The values of these URIs are then analysed to identify the type of elementary object transporting the data, then the associated container is created. Several cases of pictures are distinguished which each correspond to a particular type of container.

For an image:

```
<picture_description>
    <posx value="100"/>
    <posy value="200"/>
    <width value="300"/>
    <heigth value="300"/>
    <uri value="cinema/picture:Matrix1"/>
</picture_description>
```

The 'uri' attribute here represents the reference to an image.

It is important to note here that in the case where the image is managed by the application itself, it is not necessary to create a container. In effect, this is declared in the data conductor, and is referred to by a URI of which the Stream Locator has as a value 'appli_id'. There is thus in no case a creation of a new container.

With regard to the PageSet, the URI which references the text is declared at the level of a <text_line> element contained in the  element. One notes here that in the case where the PageSet references an item of data of type text, the editing tool need only give information regarding a single page. It is the Data Exchanger which is responsible for duplicating the page model as many times as is necessary in view of the length of the text after its formatting. In effect, reading the values of the width and the height of the text block in the page allows the calculation of its fragmentation into several pages. Equally, one can specify that the first page of the PageSet can contain a reference to an external image. In this case, the image will also be duplicated on all of the pages, with the same size and position properties. The structure of a PageSet has the following structure:

```
<pageset uri="mag+/pageset:1">
        ........
            <pages>

........
<picture_description>
                        <posx value=""/>
                        <posy value=""/>
                        <width value=""/>
                        <height value=""/>
                        <object_id>
                            <uri
                                value="BdP/picture:CAC40"/>
                        </object_id>
</picture_description>
        .........
            <text>
                        <width value=""""/>
                        <height value=""""/>
                        <text_lines>
                        .........
                            <uri value="BdP/text:CAC40_
                                Commentaires"/>
                            .........
                            <text_lines>
                        </text>

</pages>
</pageset>
```

With regard to the Menu, the principle for the Menu is to associate it with a unique URI of type list whose value contains the collection of information regarding the different items in the menu and of the PageSet used to display the editorial data. This URI is present at the level of the <items> element. Here one can bear in mind that the <items> element only contains a single <item> element. In effect, given that each of the items in the menu point to the same type of PageSet, it suffices only to define the graphical properties for a single item. A duplication system then allows as many menu items to be inserted as necessary in relation to the content of the URI, in accordance with the volumetric limitations of the system.

The <menu> object can be represented in the following form:

```
<menu uri="mag+/menu:1">
        <menu_description>
            .......
            <items uri="canal+/menu_foot">
                <item>
                    <attrributes_description>
                        <reserved/>
                        <bitmap_attributes value=""/>
                        <legend>
                            <line><![CDATA[...]]></line>
                        </legend>
                        <labels>
                            <label>
                                <line><![CDATA[...]]></line>
                            </label>
                        </labels>
                    </attributes_description>
                    <event>
                        <flag_action value="1"/>
                        <actions>
                            <next_object>
                                <object_id>
                                    <uri value="mag+/pageset:1">
                                <object_id>
                            </next_object>
                        </actions>
                    </event>
                </item>
            </items>
        </menu_description>
</menu>
```

With regard to PageSet, this file does not require individual treatment, since it is loaded at the same time as the associated Menu is read. The search for <uri> elements is thus not conducted for this type of file.

Creation/modification of a container: the container is in fact an XTVML file, identified by a TID/TIDExt, which should contain the data as such. It is possible to distinguish different container structures:

With respect to the image container, this container is entirely created from the declaration of a URI in a <picture_description> element. Thus one obtains, for example:

```
<picture tid="" tidext="">
    <data>
        <picturefile value=""/>
    </data>
</picture>
```

The <data> element contains a unique <picturefile> element which possesses a 'value' attribute whose value must refer to an MPEG image file.

With respect to the PageSet container, this container is in fact entirely copied from a <pageset> file sent in the data conductor.

```
<pageset tid="" tidext="">
    ......
    <pages>

......
            <picture_description>
                <posx value=""/>
                <posy value=""/>
                <width value=""/>
                <height value=""/>
                <object_id>
                    <uri value="BdP/picture:CAC40"/>
                </object_id>
            </picture_description>
            ......
            <text>
                <width value=""/>
                <height value=""/>
                <text_lines>
                    ......
                    <uri value="BdP/text:CAC40_Commentaires"/>
                    ......
                </text_lines>
            </text>

</pages>
</pageset>
```

The <pageset> element contains several elements giving information on the graphic presentation (position, size, colours, and so on) and a <pages> element which itself contains a  element. This  element, representing the model of the page, possesses a <text_lines> element and/or a <picture_description> element referencing respectively an external piece of text or image. In the case where the URI references a piece of text, the text is fetched to be inserted directly in the PageSet file. On the contrary, in the case of a reference to an image, a <picture> type container is created as described above.

With respect to the Menu, as for the PageSet, the container associated with the Menu is entirely copied from the XTVML menu file, except that the 'uri' attribute of the <menu> element is replaced by the 'tid' and 'tidext' pair of attributes.

```
<menu tid="" tidext="">
    <menu_description>
        ......
        <width value=""/>
        ......
        <items uri="canal+/menu_foot">
            <item>
                <attributes_description>
                    <reserved/>
                    <bitmap_attributes value=""/>
                    <legend>
                        <line><![CDATA[...]]></line>
                    </legend>
                    <labels>
                        <label>
                            <line><![CDATA[...]]></line>
                        </label>
                    </labels>
                </attributes_description>
                <event>
                    <flag_action value="1"/>
                    <actions>
                        <next_object>
                            <object_id>
                                <uri value="mag/pageset:1">
                            <object_id>
                        </next_object>
                    </actions>
```

```
            </event>
         </item>
         ........
      </items>
   </menu_description>
</menu>
```

Furthermore at this stage, the contents of the PageSet file linked to the URI defined in the <next_object> XML block is retrieved. This allows a container to be created which will serve as a model for the creation of each of the PageSets corresponding to the menu items. The PageSet file is similar to the PageSet file defined above, except that its TidExt is variable in relation to the menu item causing its display. It is also noted that the URIs defined in the PageSet at the level of the image and of the text block are identical and directly reference the complete block of the data list.

```
<pageset tid=""tidext="">
     ........
     <pages uri="canal+/menu_foot">

........
               <picture_description>
                    <posx value=""/>
                    <posy value=""/>
                    <width value=""/>
                    <height value=""/>
                    <object_id>
                         <uri value="canal+/menu_foot:picture_name"/>
                    </object_id>
               </picture_description>
               .......
               <text>
                    <width value=""/>
                    <height value=""/>
                    <text_lines>
                         .......
                         <uri value="canal+/menu_foot:body"/>
                         ........
                    </text_lines>
               </text>

</pages>
</pageset>
```

It is also noted that these two containers (Menu and PageSet) remain linked over time, which implies the regrouping at the level of the data conductor. This point wi be discussed in more detail below.

Upon creation, the container is loaded into memory, taking care to associate with it the URI of the referenced data.

Assignment of the broadcast parameters: the reading of the 'Diffusion.xml' file allows the value of the TID corresponding to the container type to be retrieved, and the TIDExt counter gives the value. This pair is then used to ascertain information regarding the TID and TIDExt attributes of the container. One obtains, for example, for an image type container:

```
<picture tid="154"tidext="10">
     <data>
```

```
          <picturefile value=""/>
     </data>
</picture>
```

Replacing the URI with the broadcast parameters: this operation is identical to that presented in the paragraph regarding reading the contents of an XTVML object file. In the example given above, the following gives the description of an image on a screen:

```
<picture_description>
     <posx value="100"/>
     <posy value="200"/>
     <width value="300"/>
     <height value="300"/>
     <object_id>
          <object_tid value="154"/>
          <object_tidex value="10"/>
     </object_id>
</picture_description>
```

Insertion of the default value: the notion of the default value allows one to broadcast the container with a real item of data displayable at the level of the receiver/decoder, and this does not take into consideration the sending of data by the Content Provider. This fact makes it possible to broadcast together XTVML objects comprising the scenario without the risk of a 'broken link' problem.

Once the structure of the container is created, reading the default value in the 'Reference.xml' file allows the content to be replaced by a concrete value.

With respect to the Image type, the reading of the content of the CDATA section type element gives the name of the MPEG image file. This value is preceded by the string indicating the local index where the image file has been stored at the time of its reception by the Data Exchanger, then it is inserted in the 'value' attribute if the <picturefile> element. Finally, one obtains the following:

```
<picture tid="154"tidext="10">
    <data>
        <picturefile value="..\mag+\pictures\matrix1.mpg"/>
    </data>
</picture>
```

With respect to the PageSet type, as previously explained, the case of the referencing in the PageSet of a dynamic image again manages an autonomous image type container. The treatment of the default value is thus effected in the context of a <picture> type container.

So far as the referencing of a raw block of text is concerned, the reading of the content of a CDATA section type element of the reference gives the collection of text without assembling it. For reasons of performance at the receiver/decoder, the assembly of the blocks of text is effected at the Data Exchanger level. To do this, the first stage consists of retrieving, in the XTVML object displaying the text block, the parameters of display size, that is to say <width> and <height>. Then, a module must allow the collection of text to be cut as a function of the width and height of the PageSet object, and as a function of the font size (18 or 21). This module also takes into account the alignment (right, left, justified). In the case of justification, spaces between words may be added. Furthermore, the lines of text are inserted into the Data Section, which allows the use of characters normally reserved in the XML language notation. One obtains, by way of example, the following type of file:

```
<pageset tid="153"tidext="2">
    .......
    <pages>

.........
            <picture_description>
                <posx value=""/>
                <posy value=""/>
                <width value=""/>
                <height value=""/>
                <object_id>
                    <object_tid value="154"/>
                    <object_tidex value="8"/>
                </object_id>
            </picture_description>
            ......
            <text>
                <width value=""/>
                <height value=""/>
                <text_lines>
                    .......
```

-continued

```
                    <line><![CDATA[Flash de derniere
                        minute:]]></line>
                    ........
                    <line><![CDATA[Chute de 30% de
                        l'indice des
        nouvelles technologies.]]></line>
                    .......
                    <line><![CDATA[L'indice a affiche
                        3900 points a la
        cloture aujourd'hui...]]></line>
                </text_lines>
            </text>

</pages>
</pageset>
```

With respect to the Menu type, as previously discussed, the menu is associated with a unique URI. The value of this URI allows an XML block containing the collection of data to be retrieved.

The reading of this XML block allows the default values of the first item to be known, that is to say, the value of their legend (<legend>) and their label (<label>).

The principle of inserting the default values of the legends and the labels of the menu items is practically identical to that created for the PageSet. In effect, one retrieves the character string representing the default value, then its length with respect to the width of the <item> elements is verified. This width is discovered in the 'value' attribute of the <width> element located within the <menu_description> element. In the case where the length of the default character string is longer than the width of the items, one proceeds to truncate the string, taking care to replace the last three characters by three '.' characters.

For the replacement of the URI defined in the <next_object> block, it must be replaced by a 'tid'/'tidext' pair, and implies the creation of a PageSet type file identified by the same pair and supported on the model defined by the <pageset> container associated with the <menu> file. This <pageset> file is as follows:

```
<menu tid=""tidext="">
    <menu_description>
        .....
        <width value="150/">
        ......
        <items>
            <item>
                <attributes_description>
                    <reserved/>
                    <bitmap_attributes value=""/>
                    <legend>
                        <line><![CDATA[Resultats D1]]></line>
                    </legend>
                    <labels>
                        <label>
                            line><![CDATA[ResultatsD1]]></line>
                        </label>
                    </labels>
                </attributes_description>
                <event>
                    <flag_action value="1"/>
                    <actions>
                        <next_object>
                            <object_id>
                                <uri value="mag+/pageset:1">
                            <object_id>
                        </next_object>
                    </actions>
                </event>
            </item>
```

```
    ......
    </items>
  </menu_description>
</menu>
```

So far as the PageSet object to which the item points is concerned, the default values concerning the image and the text block are treated in the same fashion as a classic PageSet seen above.

Insertion of a container into the data Operator: this stage consists of adding a <container> element to the 'Conductor.xml' file. This element contains several attributes which are 'stream_locator' and 'data_locator', containing the values of the URI parameters of the referenced data. It is important to note at this point that, by contrast to the <table> elements, it is the parameters of the URI that are inserted and not the 'uri' attribute. This is done with the goal of optimising the localisation of the containers in the Operator at the moment that the real data linked to the reference is broadcast, this type of use being present below.

Another attribute, the 'datatype' attribute, is also inserted to give information regarding the type of data carried by the container (datalist, text, picture, for example). For each of these types of container, the XML block structure being attached differs in the following manner:

With regard to the Picture type:

```
<container stream_locator="cinema/picture"data_
  locator="Matrix1"datatype="picture">
      <![CDATA[containerXML...]]>
  </container>
```

The <container> element only here contains a single sub-element of Section Data type representing the XML block of the image file.

With respect to the PageSet type:

```
<container stream_locator="bourse_de_
  paris"data_locator="CAC40"datatype
="text" width="300" height="150"align="j"font="18">
      <![CDATA[container XML...]]>
  </container>
```

The <container> element always contains here a single sub-element of Section Data type which represents the XML block of the PageSet file. It possesses a further four supplementary attributes of 'width', 'height', 'align' and 'font', which are respectively the width, the height, the alignment of the text block on the PageSet page, and the size of the font. These parameters are essential when assembling the raw text, and splitting it into several blocks.

With respect to the Menu type:

```
<container stream_locator= ="canal+"data_locator"menu_
  foot"datatype="datalist">
      <menu width="150">
          <![CDATA[container XML...]]>
      </menu>
      <pageset width="300" height="150"justif="j">
          <![CDATA[container XML...]]>
      </pageset>
  </container>
```

In this case, as mentioned above, the menu and the PageSet must be linked, because the URI is common to the two objects. Also the <container> element contains this time two sub-elements:

The first, <menu>, possesses an attribute giving information on the width of the menu items, useful for verifying the length of the label chain, and an element of Section Data type, which represents the menu XML block.

The second, <pageset> possesses the four attributes giving information on the width, height and alignment of the text block of the PageSet pages as well as the font size, necessary for the assembly of the raw text. It contains also a Section Data type element, which represents the PageSet XML block.

This can give as conductor:

```
<conductor appli_id="mag+"diff_id="mag+_
test"name='test1'start_date="01/10/2000
20:00">
    <table uri="mag+/screen:1"/>
    <table uri="mag+/menu:1"/>
    <table uri="mag+/menu:2"/>
    <table uri="mag+/pict:1"/>
    <table uri="mag+/pict:2"/>
    <container stream_locator="cinema/picture"data_
      locator="Matrix1"datatype
="picture">
        <![CDATA[container XML...]]>
    </container>
    <container stream_locator="bourse_de_paris"data_
      locator="CAC40"
datatype+"text"width+"300" height="150" align="j"font="18">
        <![CDATA[container XML...]]>
    </container>
    <container stream_locator =canal+"data_
      locator ="menu_foot"
datatype+"catalogue">
        <menu width="150">
            <![CDATA [container XML...]]>
        </menu>
        <pageset width ="300" height ="150" align ="j" font = "18"
            <![CDATA [container XML...]]>
        </pageset>
    </container>
</conductor>
```

XTVML file MPEG conversion: after the analysis of the collection of URIs of each of the XTVML files in the 'Conductor.xml' file, a re-reading of each <table> and <container> element can allow:

First, the loading in a list of DOM of each XTVML file contained in the sub-elements of DATA Section type.

And second, the conversion of each XTVML file into an MPEG table via the XML2MPEG converter, and storing the result in a memory list.

Transfer to SBI: as soon as all of the XTVML files have been converted into MPEG format, it remains to transfer them on the PID with which they are associated. To find the correct PID and SBI, the parameters corresponding to the type of XTVML object are sought within the 'Diffusion.mxl' file. The type of object being determined by the name of the root element of its XTVML file, it is necessary to search for the <object> element which possesses the correct 'type' attribute value. It then remains to read the value of the 'period' attribute to obtain the cycle times, then that of the 'pid' attribute of the parent <pid_data> element. Finally, the value of the 'sbi_id' attribute of the <pid_data> element allows the corresponding <sbi> element to be found, and the physical parameters to be read.

For reasons of simplifying the management of the ceasing of broadcasting MPEG tables, the transfer mode of the tables is the indirect mode. This signifies that the broadcast of each of the tables are identified by a 'Data ID', and that a 'Conductor ID' is specified for the tables to be sent for each SBI. It is important to note that one distinguishes several collections of MPEG tables linked to several 'Conductor IDs'. Indeed, as is explained in detail below, the broadcast of referenced data can be differentiated, and the containers thus possesses their own 'Conductor ID' in order to be able to independently control their broadcast at the SBI level. In summary, a 'Conductor ID' is declared which groups together the collection of MPEG tables corresponding to the <table> elements in the 'Conductor.xml' file, and a 'Conductor ID' for each <container> element.

The 'Data IDs' have the value of the 'uri' attribute of the <table> or <container> elements.

For the 'Conductor ID', two cases are distinguished:

With respect to <table> elements: all of the MPEG tables corresponding to each of these elements are linked to the same 'ConductorID'. It has as its value the result of the concatenation of the value of the 'appli_id' attribute and the value of the 'name' attribute of the root element of the 'Conductor.xml' file.

With respect to <container> elements: each of the MPEG tables linked to this type of element possess their own 'Conductor ID'. It takes as its value the result of the concatenation of the value of the 'uri' attribute of the <container> element and the value of the 'appli_id' attribute of the root element of the 'Conductor.xml' file, which guarantees consistency at the Data Exchanger level.

With the aim of simplifying the supervision of the broadcasting of tables, a 'Broadcast.xml' file is constituted by the sequence of transfers. It is composed of the list of SBIs, and for each SBI, the collection of parameters necessary for the connection. The time of the start of the broadcast, and optionally the time of the end, is also indicated. It has the following form

```
<broadcast>
    <conductor id= "mag+_test1" start = "10/11/2000 8:00 end ="">
        <sbj ip = "150".1.2.3" port ="1" pid = "3207"/>
        <sbi ip = "150.1.2.32 port = "2" pid = "4210"/>
    </conductor>
</broadcast>
```

Stopping the broadcast of objects of the preceding scenario: at the start of the transfer of each of the MPEG tables constituting the 'Conductor.xml' file, in the 'Conductor.old.xml' file (corresponding to the conductor of the previous scenario), the value of the 'id' attribute of the root element is retrieved, which value represents the value of the 'Conductor ID' parameter used for the transfer of the preceding scenario. To each SBI featuring in the list is also sent a command of type 'Reset Broadcast' containing that value. Once this operation has finished, the 'Conductor.old.xml' file can be deleted.

Notification: whatever the result of the previous operations, the Programme Provider is notified by a message describing the collection of broadcast data Broadcast of an External Referenced Datum The broadcast of an external referenced datum will now be described in more detail.

Figure 16:
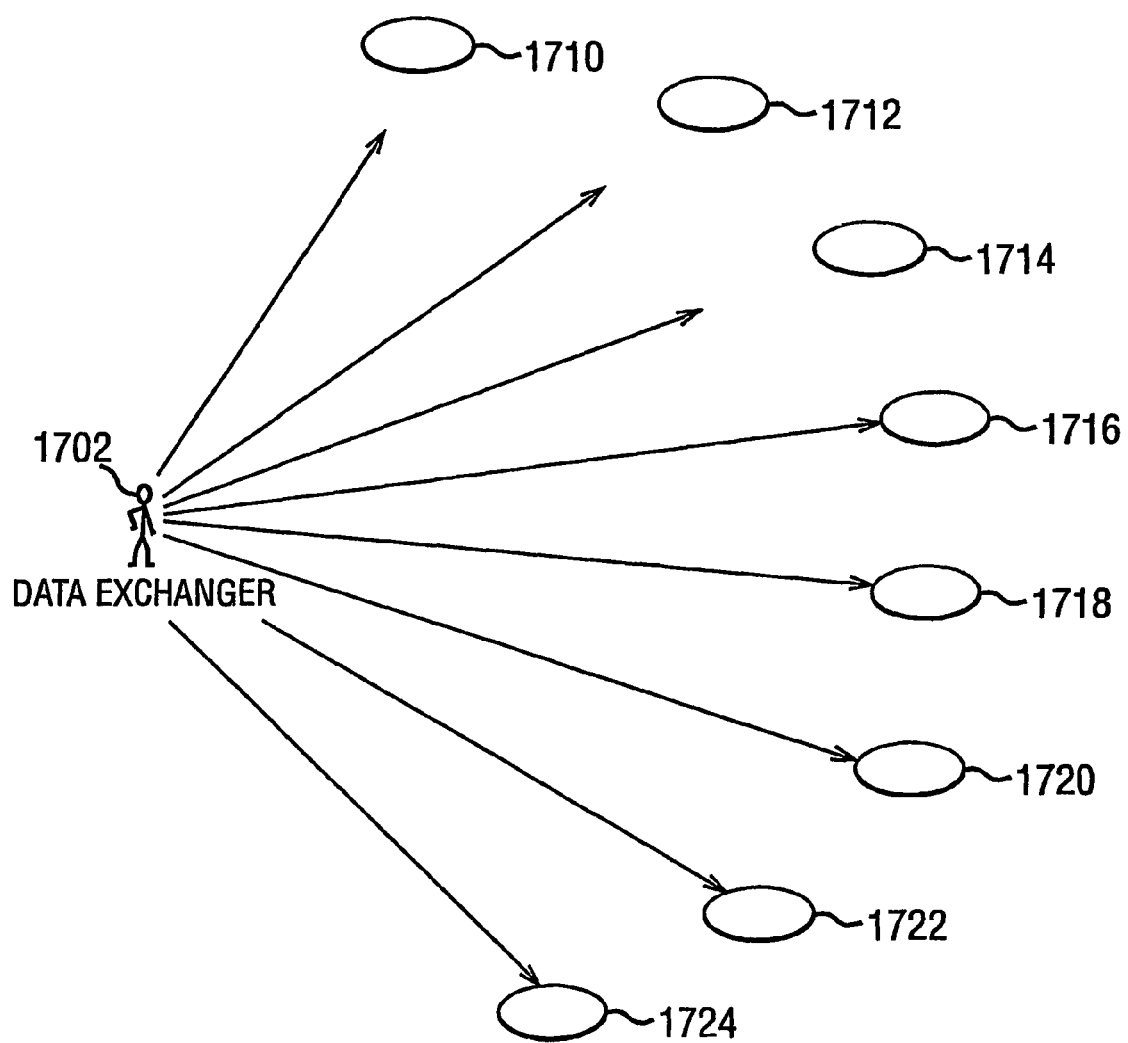
FIG. 16 is a general diagram illustrating the broadcast of an external referenced datum.

FIG. 16 is a general diagram illustrating the broadcast of an external referenced datum A Data Exchanger 1702 is shown, as well as related processes comprising receiving the XML file containing the item of data 1710; identifying the Stream Locator of the received XML file 1712; recovering the containers linked to the found Stream Locator 1714; reading the Data Locator of each container 1716; recovering the item of data corresponding to the Data Locator of the container 1718; inserting the item of data within the container 1720; converting the container to MPEG format 1722; and broadcasting the container 1724.

Figure 17:
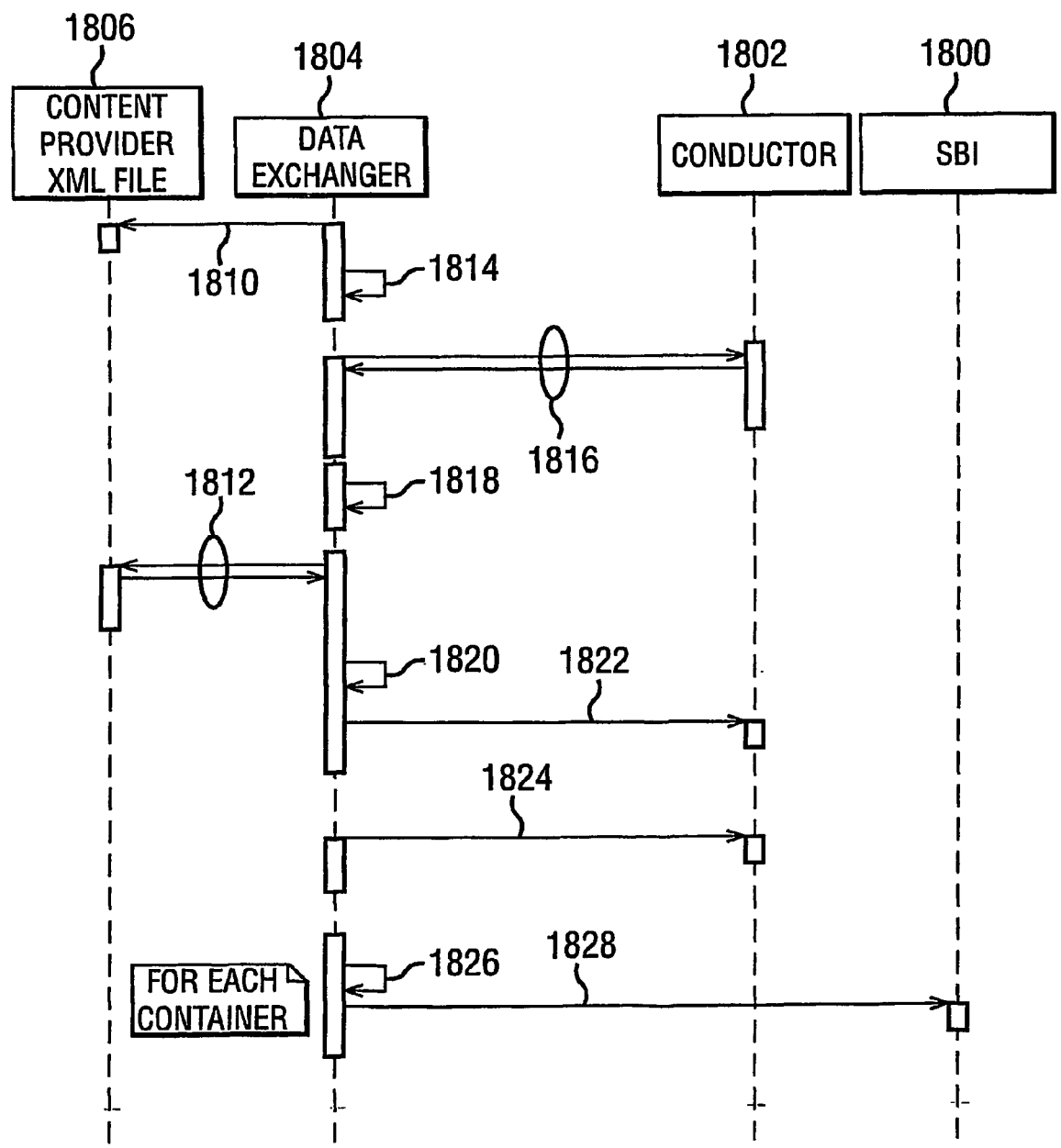
FIG. 17 is a sequence diagram also illustrating the broadcast of an external referenced datum.

FIG. 17 is a sequence diagram also illustrating the broadcast of an external referenced datum. The sequence of events relating to an SBI 1800, a conductor 1802, a Data Exchanger 1804, and a Content Provider XML file 1806 is shown, the events in particular comprising, reading 1810, looking for the data unit associated with the Data Locator 1812, analysis of the Stream Locator 1814, retrieving the containers associated with the Stream Locator 1816, reading the Data Locator from a container 1818, inserting the data unit into the container file 1820, storing the new container file 1822, reading from the Operator [updating the terminated containers] 1824, MPEG conversion 1826, and broadcasting the container 1828.

Features relating to receiving the XML file containing the referenced datum; analysis of the Stream Locator; retrieval of the containers attached to the Stream Locator; reading the Data Locator of the container; searching for the datum in the XML file for the Content Provider corresponding to the Data Locator; inserting the data within the container; reading the containers of the conductor; and conversion into MPEG and broadcasting to the SBI will now be described in more detail.

Receiving the XML file containing the referenced data: the referenced data is transmitted by the Content Provider at the frequency of its choice. A scanning system at the Data Exchanger level allows a 'Data.xml' file to be retrieved which contains information describing the data properties. This file is identified by the value of the 'stream_locator' attribute of the root element, and possesses a collection of <datum> elements. These <datum> elements contain the Data Locator of the reference, the data type and the <start_date> attribute, which represents the date and time of the start of the broadcast of the data. The indirect transmission mode to the SBI in effect allows the postponement of the broadcast of the data. Nevertheless, the end of the broadcast of data is not taken into account by the Data Exchanger, and is left as the responsibility of the Content Provider.

In the case of the image type data, the MPEG files are also sent.

```
<data stream_locator = "Bourse_de_Paris" date = "01/10/2000">
    <datum data_locator = "CAC40" datatype =
    "catalogue" start_date =
"01/10/2000 20:00">
    .....
    </datum>
    <datum data_locator = "LogoBDP" datatype =
    "picture" start_date =
"01/10/2000 12:00">
        <![CDATA [logo.mpg]]>
    </datum>
</data>
```

Analysis of the Stream Locator: this operation consists simply of reading the 'stream_locator' attribute of the previously received 'Data.xml' file.

Retrieving the Containers associated with the Stream Locator: this stage consists of retrieving, from the 'Conductor.xml' file stored at the Data Exchanger level the list of <container> elements having a 'stream_locator' attribute value equal to that of the 'stream_locator' attribute of the file sent by the Content Provider. By way of example, for a Stream Locator equal to "canal+", the following elements can be retrieved:

```
<container stream_locator = "canal+" data_locator =
"logo1" datatype = "picture">
        <![CDATA [container XML...]]>
    </container>
    <container stream_locator = "canal+" data_locator =
"menu_foot" datatype =
"datalist">
        <menu width = "150">
            <![CDATA [container XML...[[>
        </menu>
        <pageset width = "300" height = "150" justif = "j">
            <![CDATA [container XML...]]>
        </pageset>
</container>
```

Reading the Data Locator of a container: once the <container> elements have been isolated in memory, the value of their 'data_locator' attributes are read iteratively to allow the data block in the 'Data.xml' file to be identified.

Searching for the data in the Content Provider XML file corresponding to the Data Locator: for each container, the value of the 'data_locator' attribute allows the <datum> element to be retrieved from the 'Data.xml' file possessing a 'data_locator' attribute having the same value. Several cases are distinguished in accordance with the type of data indicated by the value of the 'datatype' attribute of the <datum> element:

With respect to the picture type: the content of the sub-element of type CDATA Section which contains the name of the MPEG image file is extracted.

With respect to the text type, the content of the sub-element of type CDATA Section which contains the raw text block is extracted.

With respect to the datalist type, the XML block containing the collection of data corresponding to each of the menu items is retrieved.

Inserting the data into the container: the following different cases are always distinguished:

With respect to the picture type: in the same way as the default value, the name of the MPEG image file is set to the value of the 'value' attribute of the <picturefile> element of the container.

With respect to the text type: the raw text block is formatted in accordance with the constraints of size and the justification retrieved in the attributes of 'width', 'height', and 'justif', such that it is chopped into lines. The height 'height' allows the global number of pages necessary for displaying the whole of the text to be determined. The  element of the container of type PageSet is thus duplicated as many times as necessary, and in there are inserted, at the level of the <text_lines> element, the lines of the blocks in the order in which they appear.

With respect to the datalist type: for each of the items found in the data block retrieved in the previous stage, an item is added within the <menu> object.

In the same fashion as the default value, the name of the MPEG image file is set to the value of the 'value' attribute of the <picturefile> element of the container.

Reading the containers of the conductor: once the broadcast ends of all of the containers connected with the Stream_Locator of the file received from the Content Provider, the 'Conductor.xml' file is filtered so as to only keep the <container> elements. In iterative fashion, the XML file corresponding to each of these is loaded into memory, and these are converted into MPEG format.

MPEG conversion and broadcast across the SBI:

A message will appear of the type: Error! Source unavailable.

Stopping the Broadcast of an External Referenced Datum

The stopping of the broadcast of an external referenced datum will now be described in more detail.

Figure 18:
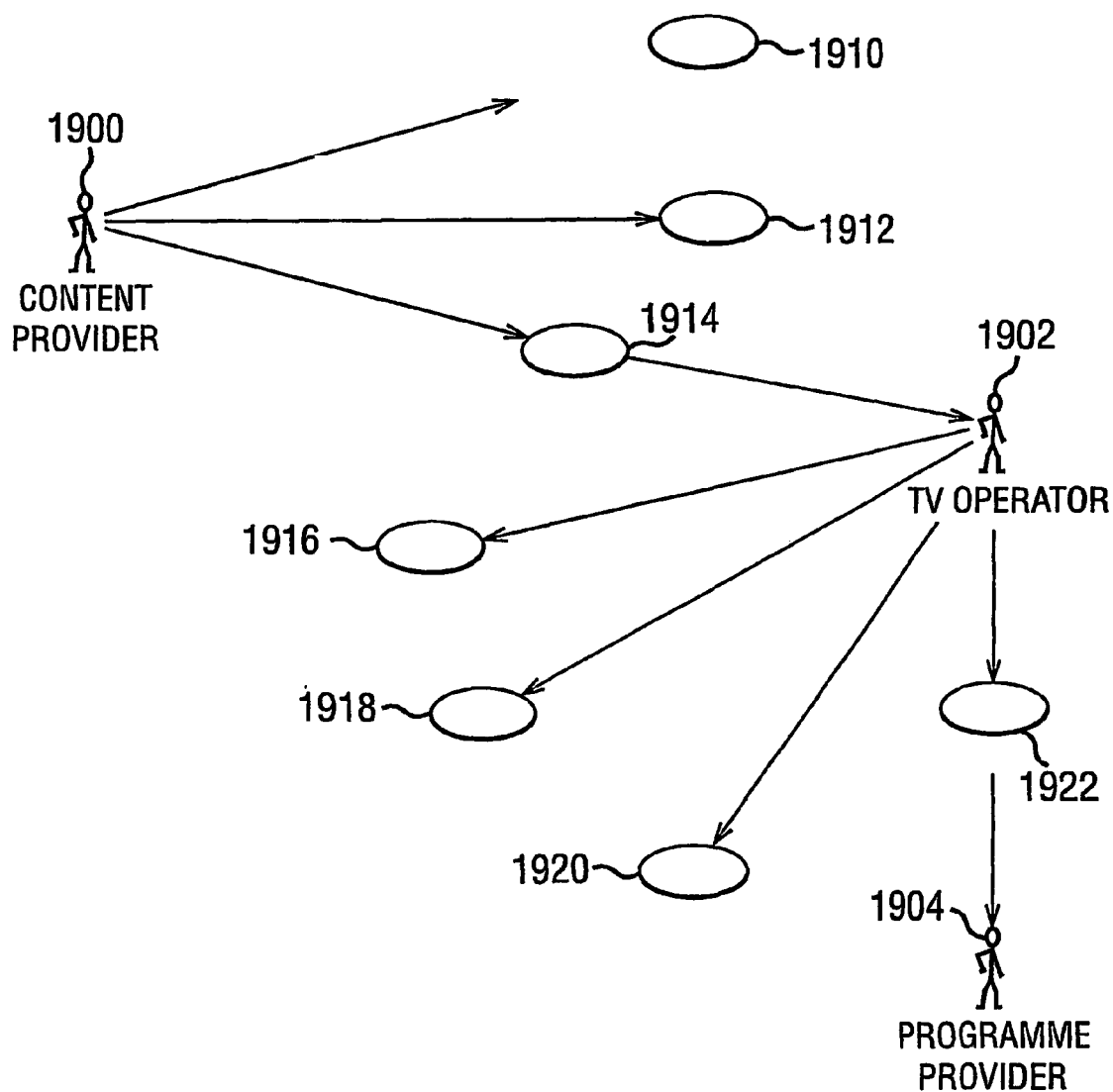
FIG. 18 is a general diagram illustrating the stopping of the broadcast of an external data reference.

FIG. 18 is a general diagram illustrating the stopping of the broadcast of an external referenced datum. In particular, and as described below, it illustrates the relationship between a Content Provider 1900, a TV Operator 1902, and a Programme Provider 1904, and various concepts or processes comprising retrieving the list of data referenced during the broadcast 1910, selection of a reference 1912, requesting the stopping of the broadcast 1914, retrieving the containers broadcasting the data unit 1916, updating the containers by insertion of the default value of the associated data unit 1918, broadcast of the new containers 1920, and notification of the Programme Provider by the TV Operator 1922.

FIG. 19 is a sequence diagram also illustrating the stopping of the broadcast of an external referenced datum The sequence of events relating to a Content Provider 2000, a Programme Provider 2002, a Data Exchanger 2004, and an SBI 2006 is again shown, the events in particular comprising selecting a data unit being broadcast 2010, requesting the stopping of the broadcast 2012, retrieving the containers connected with this data unit 2014, replacement of the referenced data unit by its default value 2016, MPEG conversion of the Containers 2018, sending of the files for broadcast 2020, and notifying the stopping of the broadcast of the data unit 2022.

Features relating to retrieval of the referenced data list during broadcast 'Section of the datum of which broadcasting is to be stopped'; retrieval of the containers; insertion of the default values in the associated container(s); and broadcast of associated container(s) will now be described in more detail.

Retrieving the list of data referenced during the broadcast: each Content Provider can consult at any moment the list of its referenced data which is broadcast by the Operator. To do this, a WEB application is used via an intranet.

Selection of the data whose broadcast is to be stopped: the Content Provider selects in the list of URIs the data in question, which has the direct consequence of preparing an XML file which is immediately sent to the Data Exchanger by means of the HTTP client. This file contains the URI of the data to stop. This filed has the following form:

```
<data_stop uri = "canal+ :logo1">
```

Retrieving the containers: reading the 'data_stop' file gives the URI of the data. The decomposition of this URI into Stream Locator and Data Locator allows the extraction from the 'Conductor.xml' file of the <container> elements whose 'stream_locator' and 'data_locator' attribute values correspond. It is recalled that the structure of these elements is as follows:

```
<container stream_locator = "cinema/picture" data_locator =
"Matrix1" datatype =
"picture">
        <![CDATA [container XML...]]>
    </container>
```

```
<container stream_locator = "bourse_de_paris"
    data_locator = "CAC40" datatype
= "text" width= "300" justif = "j">
    <![CDATA [container XML...]]>
</container>
```

Reading the CDATA Section of each of these elements gives the container XML file.

Insertion of the default value in the associated container(s): see paragraph regarding insertion of default values.

Broadcasting associated containers: see paragraph regarding transfer to SBI.

Ceasing the Broadcast of a Scenario

The ceasing of the broadcast of a scenario will now be described.

Figure 20:
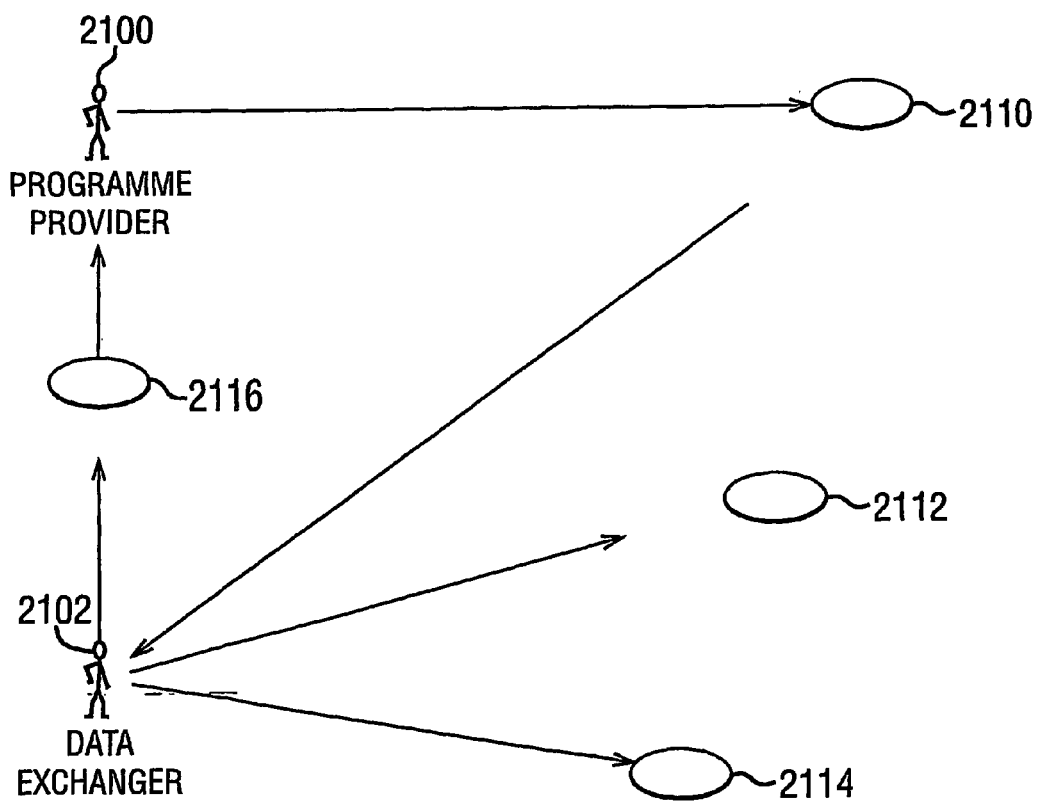
FIG. 20 is a general diagram illustrating ceasing the broadcast of a scenario.

FIG. 20 is a general diagram illustrating ceasing the broadcast of a scenario. In particular, and as described below, it illustrates the relationship between a Programme Provider 2100 and a Data Exchanger 2102, and various concepts or processes comprising requesting the stopping of a scenario 2110, reading information concerning the broadcast in progress 2112, a conductor Reset command 2114, and notification of the stopping of the scenario 2116.

FIG. 21 is a sequence diagram also illustrating ceasing the broadcast of a scenario. The sequence of events relating to a Programme Provider 2200, a Data Exchanger 2202, and an SBI 2204 is shown, the events in particular comprising requesting the stopping of the broadcast of a scenario 2210, identification of the request 2212, reading information concerning the broadcast in progress 2214, resetting the Operators 2216, and notification of the stopping of the broadcast 2218.

Features relating to the request for the cessation of a scenario; the 'Reset Broadcast' commands; and notification of cessation of the broadcast will now be described in more detail.

Request to cease a scenario: the Programme Provider, via the HTTP client, sends a 'reset_broadcast.xml' file containing the information on the conductor to stop. This information is in fact represented by the complete address of the conductor, that is to say:

```
<conductor appli_id="mag+" diff_id="mag+_test"
name='test1' start_date = "01/10/2000
20:00">
```

'Reset Broadcast' command: the 'broadcast.xml' file contains the collection of broadcast parameters to the SBIs:

```
<broadcast>
    <conductor appli_id = "mag+" diff_id ="mag+_test"
        name = 'test1'
start_date = "01/10/2000 20:00">
        <sbi ip = "150.1.2.3" port = "1" pid = "3207"/>
        <sbi ip = "150.1.2.3" port = "2" pid = "4210"'>
    </conductor>
</broadcast>
```

To assist the parameters read in the attributes of the <sbi> elements, a command to cease the broadcast of the corresponding SBI can be sent, specifying the value of the conductor obtained in the 'id' attribute of the <conductor> element. This procedure is effected for each SBI associated with the broadcast of the scenario.

Notification of the end of the broadcast: this action has the aim of alerting the Programme Provider to the real end of its scenario. This can be presented simply in the form of a Mail message sent to the Programme Provider.

Suppression of the Reference to an Item of Data

The suppression of the reference to an item of data will now be described.

Figure 22:
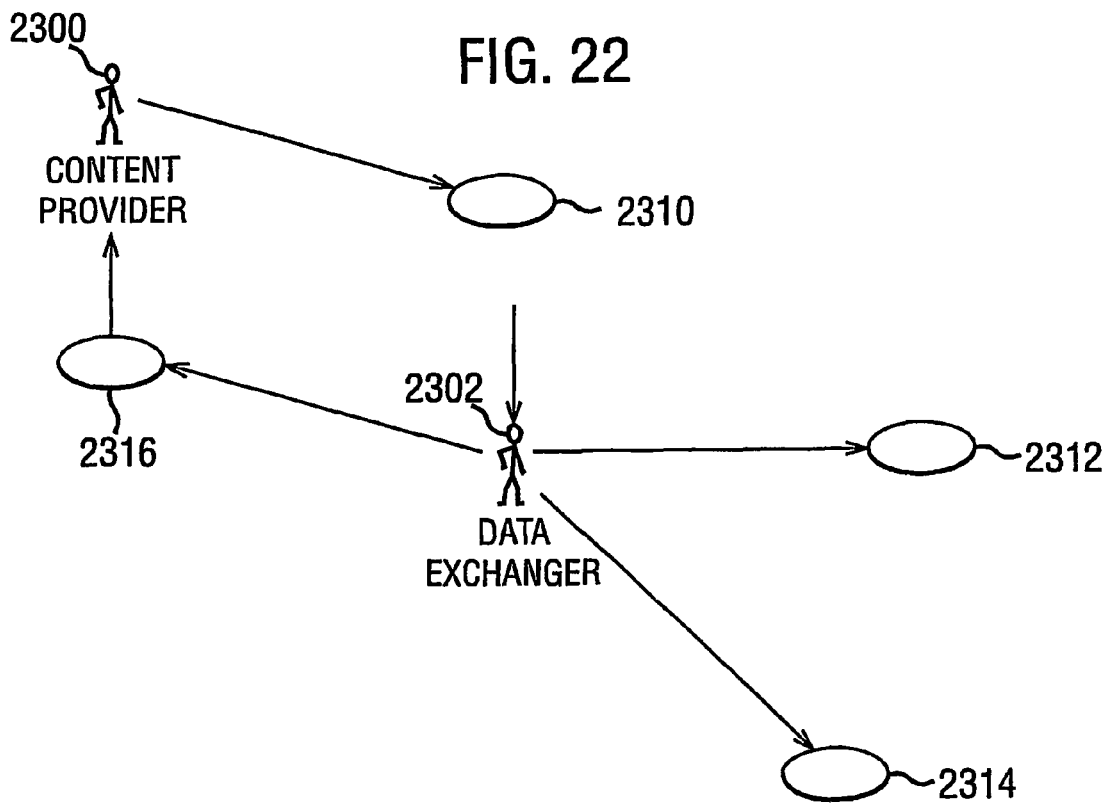
FIG. 22 is a general diagram illustrating the suppression of the reference to a datum.

FIG. 22 is a general diagram illustrating the suppression of the reference to an item of data. A Content Provider 2300 and a Data Exchanger 2302 are shown, as well as related processes comprising sending a message requesting the suppression 2310, analysis of the use of the reference 2312, updating of the references file 2314, and notification 2316.

Figure 23:
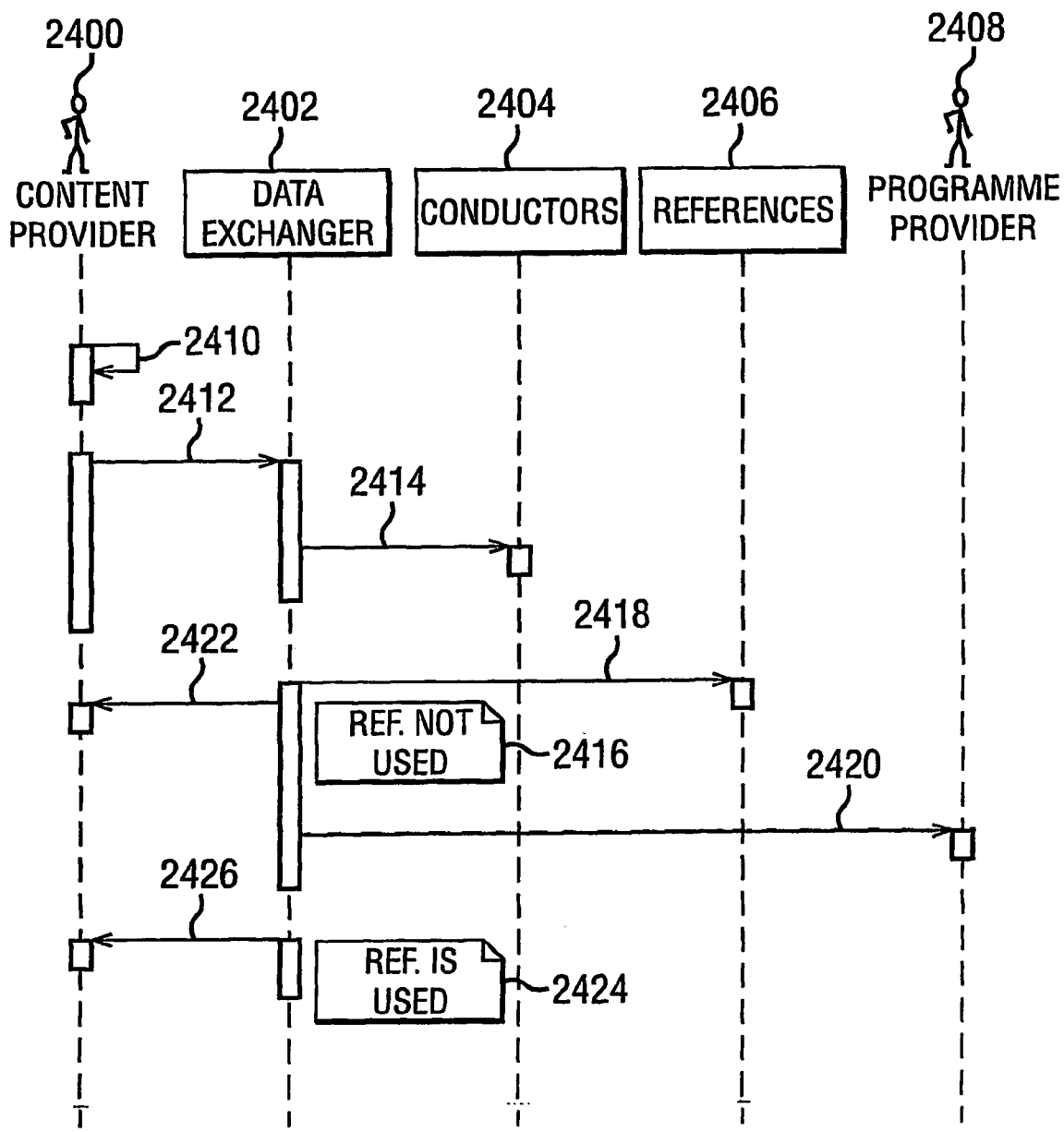
FIG. 23 is a sequence diagram also illustrating the suppression of the reference to a datum.

FIG. 23 is a sequence diagram also illustrating the suppression of the reference to an item of data. The sequence of events relating to a Content Provider 2400, a Data Exchanger 2402, Conductors 2404, References 2406, and a Programme Provider 2408 is shown, the events in particular comprising, selecting the reference to be suppressed 2410, requesting the suppression of the reference 2412, checking if the reference is being used by a scenario in the course of being broadcast 2414, and, in the case where the reference is not being used 2416, suppressing the reference 2418, sending the new references file 2420, and notifying the success 2422, or, in the case where the reference is used 2424, notifying the failure 2426.

Features relating to: selecting the reference to be suppressed; request for the suppression of the reference; searching the use of the reference; sending the new reference files; and notification will now be described in more detail.

Selecting a reference to suppress: the Content Provider selects in the URI list the data in question, which has the direct consequence of preparing an HTTP message containing the URI to request the suppression It has the following form:

```
'reference_delete = bourse_de_paris : CAC40'
```

Request to suppress the reference: this operation consists of sending a configurable request of type 'post' to the WEB server of the Operator, this request containing the above message.

Research for the use of the reference: the reception of the message sent by the Content Provider gives rise to the decomposition of the URI into its Stream Locator and Data Locator. These two parameters permit the search, within the conductors of each application being broadcast, the <container> elements which possess these two 'stream_locator' and 'data_locator' attribute values.

```
<container stream_locator = "bourse_de_paris"
    data_locator = "CAC40" datatype =
    "text" width = "300" justif = "j">
        <![CDATA [container XML...]]>
    </container>
```

The existence of such elements prevents the Content Provider effectively suppressing the reference.

In the opposite case, each of the <reference> elements in the 'References.xml' file, whose value of the 'uri' attribute corresponds to that of the reference to be suppressed, is suppressed.

```
<references>                              Element to be suppressed
    <application appli_id = "mag+ ">
        <reference uri = "bourse_de_Paris: cac40 descr =
        "Valeur du
CAC40"/>
            <![CDAT [texte]]>
        </reference>
        <reference uri = "bourse_de_Paris: SBF120" descr =
        "Valeur du
SBF120"/>
            <![CDATA [texte]]>
        </reference>
            <reference uri = "bourse_de_Paris " descr =
            "Logo de la
bourse de Paris" width = "200" height = "150"/>
                <![CDATA [logo1.mpg]]>
            </reference>
    </application>
    <application appli_id = "bn">
        ..........................................
    </application>
</references>
```

Sending a new file of references: in the case where the reference has been possible to suppress in the 'References.xml' file, the filter operation is effected as well as the sending of references to the Programme Providers concerned. See also the paragraph regarding filtering and sending of the XML file to the editing tool of the Programme Provider.

Notification: this action has the aim of alerting the Content Provider to the suppression—whether effective or not—of the reference. This can be presented in the form of a Mail type message sent to the Content Provider.

It will be understood that the present invention has been described above purely by way of example, and modifications of detail can be made within the scope of the invention.

Each feature disclosed in the description, and (where appropriate) the claims and drawings may be provided independently or in any appropriate combination.

The invention claimed is:

1. A method of preparing a received content element for presentation, comprising:
   receiving data including a content element,
   reviewing the received data to identify a reference associated with the content element, and
   using the reference to determine the presentation configuration for the content element,
wherein said method further comprises:
   associating the content element with a container, wherein associating the content element of a container comprises:
      reading a logical reference element of the container,
      recovering the content element in the received data corresponding to the logical reference element, and
      linking the content element with the container.

2. A method according to claim 1, comprising:
   using the reference to determine the location of the content element in the received data.

3. A method according to claim 1, further including the step of using the reference to identify a container for the content element.

4. A method according to claim 3, wherein the container contains the presentation configuration criteria for the content element.

5. A method according to claim 3, further comprising determining the number of containers required for presenting the content element.

6. A method according to claim 1, further comprising converting the content element in the container into a broadcastable form.

7. A method according to claim 1, further comprising reviewing the received data to identify the size of the content element and comparing the content element size with the predetermined maximum size for presentation of the content element.

8. A method according to claim 7, further comprising:
   identifying that the size of the content element is larger than the predetermined maximum size for presentation of the content element;
   identifying an excess portion of the content element being in excess of the predetermined maximum size of presentation, and
   preparing the excess portion for presentation.

9. A method according to claim 8, wherein preparing the excess portion for presentation includes linking the excess portion with a further container.

10. A method according to claim 1, further comprising sending the data for broadcast.

11. Apparatus for preparing a received content element for presentation, comprising:
    means for receiving data including a content element,
    means for reviewing the received data to identify a reference associated with the content element;
    means for using the reference to determine the presentation configuration for the content element;
    means for associating the content element with a container, wherein said associating means comprises:
       means for reading a logical reference element of the container;
       means for recovering the content element in the received data corresponding to the logical reference element;
       and means for linking the content element with the container.

12. Apparatus according to claim 11, comprising means for using the reference to determine the location of the content element in the received data.

13. Apparatus according to claim 11, further including a container for the content element, the container being associated with the reference for the content element.

14. Apparatus according to claim 13, wherein the container contains the presentation configuration criteria for the content element.

15. Apparatus according to claim 11, further comprising means for determining the number of containers required for presenting the content element.

16. Apparatus according to claim 11, further comprising means for converting the content element in the container into a broadcastable form.

17. Apparatus according to claim 11, further comprising means for reviewing the received data to identify the size of the content element; and
    means for preparing the content element size with the predetermined maximum size for presentation of the content element.

18. Apparatus according to claim 17, further comprising:

means for identifying that the size of the content element is larger than the predetermined maximum size for presentation of the content element;

means for identifying an excess portion of the content element being in excess of the predetermined maximum size of presentation;

and means for preparing the excess portion for presentation.

19. Apparatus according to claim 18, wherein the means for preparing the excess portion for presentation includes means for linking the excess portion with a further container.

20. Apparatus according to claim 11, further comprising means for sending the data for broadcast.

* * * * *

UNITED STATES PATENT AND TRADEMARK OFFICE
CERTIFICATE OF CORRECTION

| | | |
|---|---|---|
| PATENT NO. | : 7,340,528 B2 | Page 1 of 1 |
| APPLICATION NO. | : 10/472398 | |
| DATED | : March 4, 2008 | |
| INVENTOR(S) | : Christophe Colas Noblecourt et al. | |

It is certified that error appears in the above-identified patent and that said Letters Patent is hereby corrected as shown below:

On the Title page, Item (30) Foreign Application Priority Data, the application number "01400737" should read --01400737.1--.

Signed and Sealed this

Eighth Day of July, 2008

JON W. DUDAS
*Director of the United States Patent and Trademark Office*